US 6,633,222 B2

(12) United States Patent
Nagai et al.

(10) Patent No.: US 6,633,222 B2
(45) Date of Patent: Oct. 14, 2003

(54) BATTERY BREAKER

(75) Inventors: Takeshi Nagai, Nikko (JP); Kiyoshi Yamamoto, Tokyo (JP)

(73) Assignees: Furukawa Precision Engineering Co., Ltd., Tochigi (JP); The Furukawa Electric Co., Ltd., Tokyo (JP)

( * ) Notice: Subject to any disclaimer, the term of this patent is extended or adjusted under 35 U.S.C. 154(b) by 43 days.

(21) Appl. No.: 09/923,925

(22) Filed: Aug. 6, 2001

(65) Prior Publication Data
US 2002/0060898 A1 May 23, 2002

(30) Foreign Application Priority Data

Aug. 8, 2000 (JP) ........................................ 2000-240501
Aug. 8, 2000 (JP) ........................................ 2000-240505

(51) Int. Cl.[7] .................................................. H01H 37/54
(52) U.S. Cl. .................... 337/365; 337/333; 337/362; 337/379; 337/380
(58) Field of Search ................................ 337/365, 362, 337/333, 379, 380, 381, 16, 36, 111–113; 29/622

(56) References Cited

U.S. PATENT DOCUMENTS

| 3,322,920 A | * | 5/1967 | Morris ........................ 337/365 |
| 4,149,138 A | * | 4/1979 | Pevzner et al. ............. 337/372 |
| 4,414,529 A | * | 11/1983 | Yoshioka et al. ............ 337/36 |
| 4,539,545 A | * | 9/1985 | Klotz ........................ 337/380 |
| 4,551,702 A | * | 11/1985 | Hire .......................... 337/347 |
| 4,862,133 A | * | 8/1989 | Tabei ......................... 337/102 |
| 4,894,634 A | * | 1/1990 | Nezuka et al. ............. 337/343 |
| 5,212,465 A | * | 5/1993 | Mizutani et al. ............ 337/368 |
| 5,337,036 A | * | 8/1994 | Kuczynski ................. 337/343 |
| 5,939,970 A | * | 8/1999 | Tsuji et al. ................. 337/343 |

FOREIGN PATENT DOCUMENTS

| EP | 313674 A1 | * | 5/1989 | .......... H01H/37/04 |
| JP | 63-292539 A | * | 11/1988 | .......... H01H/37/54 |

* cited by examiner

Primary Examiner—Anatoly Vortman
(74) Attorney, Agent, or Firm—Knobbe Martens Olson & Bear LLP

(57) ABSTRACT

There is provided a battery breaker comprising a case, a fixed contact which is mounted to the inner bottom surface of one end of the case and is connected to a terminal extending from the case outwards, an elastic movable piece which is mounted such that its tip end protrudes into the case through the other end of the case and allows a movable contact provided at the tip end to bring into contact with the fixed contact by the spring action, and a convex curved surface-shaped bimetal which has a warping center located in the substantial center or at a position slightly one-sided from the center, is placed between the movable piece and the inner bottom surface except for the above one end of the case so as to cover a projection provided on the above inner bottom surface without interference of an outer periphery of the bimetal with the inner side surfaces of the case, and is warped at a predetermined working temperature to push up the movable piece for separating the movable contact from the fixed contact, wherein the movable piece has downwardly convex portions brought into contact with the opposite ends of the bimetal when the bimetal is warped.

15 Claims, 29 Drawing Sheets

F I G. 7
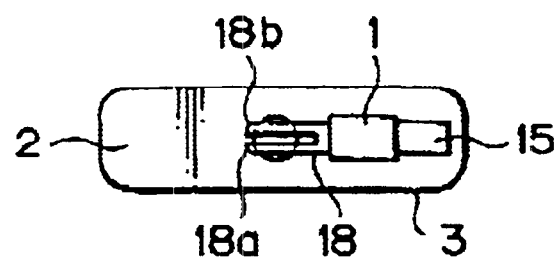
F I G. 8
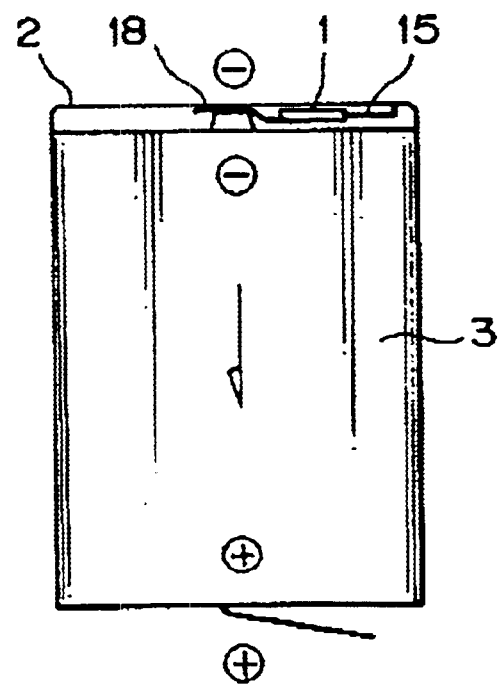

F I G. 15
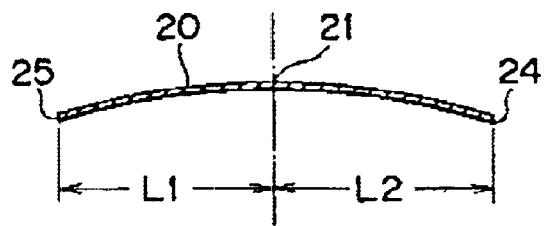
F I G. 16
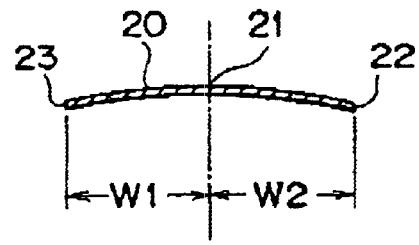
F I G. 17
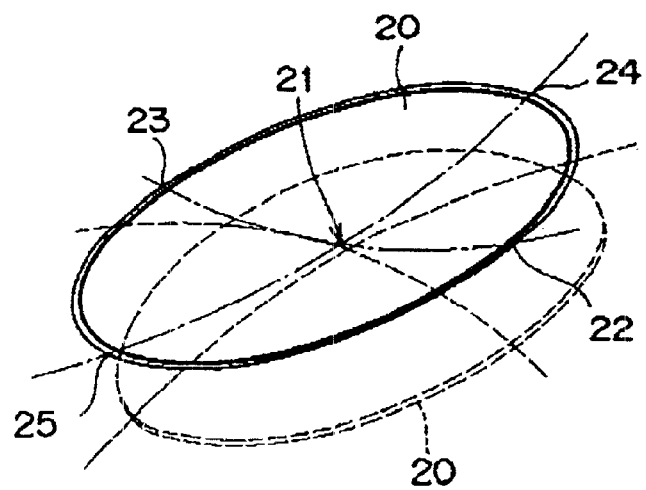

F I G. 18
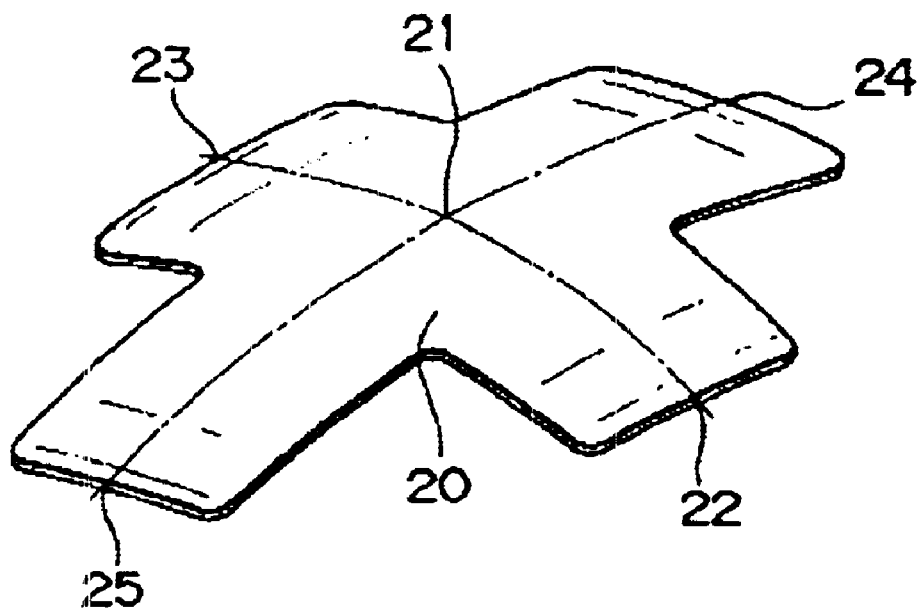

F I G. 38
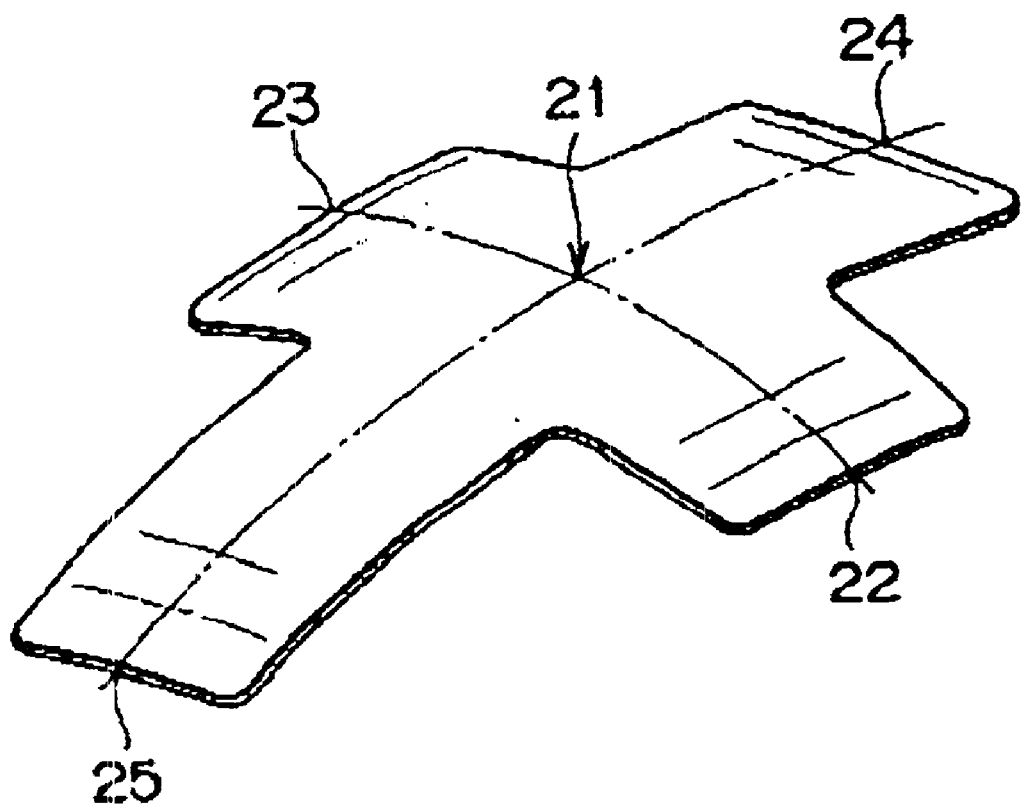

F I G. 45
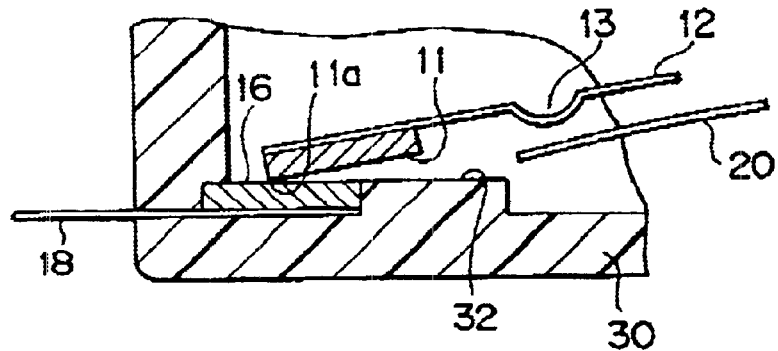
F I G. 46
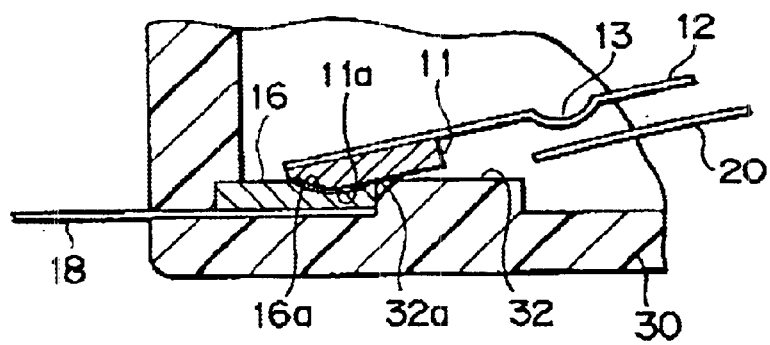
F I G. 47
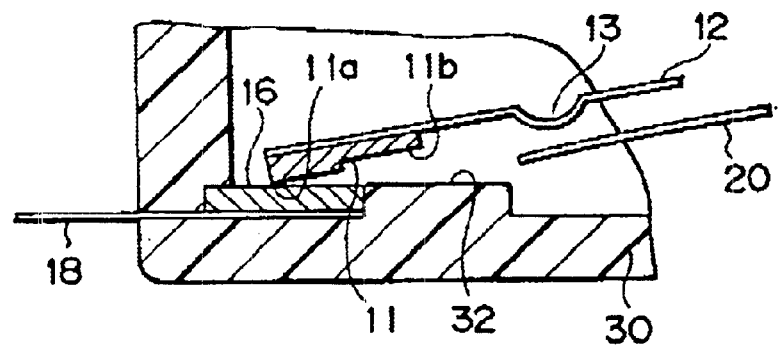

BATTERY BREAKER

BACKGROUND OF THE INVENTION

1. Field of the Invention

This invention relates to a battery breaker having a structure of bringing or separating a movable contact into contact with or from a fixed contact by the spring action of a movable piece or the warping action of a bimetal.

2. Description of the Prior Art

A description will now be given of two kinds of conventional breakers each provided with a movable piece having elasticity and a bimetal with reference to FIGS. 48 to 50.

FIG. 48 is a cross-sectional view showing a breaker (a temperature switch), and FIG. 49 is an exploded perspective view showing a main part of the breaker of FIG. 48.

Reference numeral 5 denotes a housing composed of a mounting base 50 and a cover 51 covering the upper surface of the mounting base 50. A fixed contact 60 is mounted to the inner bottom surface of one end of the mounting base 50, and an end of a terminal 61 extending from the housing 5 outwards is connected to the bottom surface of the fixed contact 60.

A band plate-shaped movable piece 63 having elasticity is mounted to the other end of the mounting base 50 such a way that the tip end of the movable piece protrudes into the housing 5 toward the fixed contact 60. The movable contact 62 fixed to the tip end of the movable piece 63 is in contact with the fixed contact 60 by the spring action of the movable piece 63. The movable piece 63 has semicircular-shaped notches 65, 65 in opposite side portions on the fixed end side, and these notches 65, 65 are brought into engagement with pins 52, 52 provided on the inner bottom surface of the mounting base 50. The movable piece 63 also has a downwardly convex portion 64 such that the tip end of a bimetal 54 which will be described later may be brought into contact with the convex portion when the bimetal is warped to make the snap action. The movable piece 63 further has a terminal 66 as one body at a portion extending from the housing 5 outwards.

The bimetal 54 having an upwardly convex curved surface is placed between the inner bottom surface of the mounting base 50 and the movable piece 63. In this place, the bimetal is warped at a predetermined working temperature to push up the movable piece 63 by the snap action resulting from warping of the bimetal for separating the movable contact 62 from the fixed contact 60.

The bimetal 54 is formed by placing a main bimetal 54a and an auxiliary bimetal 54b having a working temperature different from that of the main bimetal one over the other. The main bimetal 54a and the auxiliary bimetal 54b have semicircular-shaped notches 56, 56, 57, 57 on the opposite sides of the base ends respectively, and these notches 56, 57 are brought into engagement with the corresponding pins 52, 52.

The mounting base 50 has a projection 53 on the inner bottom surface at a position corresponding to the warping center of the bimetal 54. The projection 53 is inserted through a central through hole 55 of the auxiliary bimetal 54b until the center portion of the main bimetal 54a is brought into contact with the projection 53. The constitution described the above makes it possible to reduce one-sidedly biased distribution of bending stress of the bimetal 54.

FIG. 50 is a cross-sectional view showing another conventional breaker (a temperature switch).

A housing 7 is composed of a mounting base 70 and a cover 71 covering the upper surface of the mounting base, and a fixed contact 80 is mounted to the inner bottom surface of one end of the mounting base 70 of the housing 7. An end of a terminal 81 extending from the housing 7 outwards is connected to the bottom surface of the fixed contact 80.

A band plate-shaped movable piece 83 having elasticity is mounted to the other end of the mounting base 70 such that the tip end of the movable piece protrudes into the housing 7 toward the fixed contact 80. The movable piece 83 has a through hole in a position close to the fixed end, and a guide pin 74 provided on a convex portion 73 of the inner bottom surface of the mounting base 70 is inserted through this through hole. In FIG. 50, there is shown the state of the breaker when a bimetal 72 which will be described later is warped to separate a movable contact 82 fixed to the tip end of the movable piece 83 from the fixed contact 80 by the snap action of the bimetal. However, the movable contact 82 is normally in contact with the fixed contact 80 by the spring action of the movable piece 83. The movable piece 83 has a downwardly convex portion 84 such that the tip end of the bimetal 72 is brought into contact with the convex portion when the bimetal is warped to make the snap action. The movable piece 83 also has a terminal 85 as one body at a portion extending from the housing 7 outwards.

The bimetal 72 having an upwardly convex curved surface is placed between the inner bottom surface of the mounting base 70 and the movable piece 83. In this place, the bimetal is warped at a predetermined working temperature to push up the movable piece 83 by the snap action resulting from warping of the bimetal to separate the movable contact 82 from the fixed contact 80.

The bimetal 72 has a through hole in a position close to the base end, and the guide pin 72 provided on the inner bottom surface of the mounting base 70 is inserted through this through hole. A base end 72a serving as the warping center of the bimetal 72 is brought into engagement with the convex portion 73 on the inner bottom surface of the mounting base 70. Since the bimetal 72 has the warping center located at the base end 72a (at the right end of the bimetal in FIG. 50) as described the above, a free end (the left end of the. bimetal in FIG. 50) of the bimetal 72 is shifted upwards when the bimetal 72 is warped at the predetermined working temperature. Then, the bimetal 72 pushes up the movable contact 82 through the upwardly shifted free end to separate the movable contact 82 from the fixed contact 80.

The conventional breaker shown in FIGS. 48 and 49 presents the following problems.

Since there are the needs of forming the notches 65 in the movable piece 63 and the notches 56, 57 in the bimetals 54a, 54b and also bringing these notches into engagement with the pins 52, 52, a large number of assembly processes, the high manufacturing cost and besides, the complicated structure are required, resulting in a limitation to demands for miniaturization of the battery breaker.

Since the notches 56, 57 of the bimetals 54a, 54b are brought into engagement with the pins 52, 52, the operating performance of the bimetal is degraded. Besides, because of the need for the notches 56, 57 for the bimetal, the warping action of the bimetal easily causes cracks in the bimetal through the notches 56, 57.

The conventional breaker shown in FIG. 50 presents the following problems.

A large number of processes such as formation of the holes in the movable piece 83 and the bimetal 72 and insertion of the guide pin 74 through the holes are required, resulting in an increase in manufacturing cost.

Since the warping center of the bimetal 72 is located at the base end 72a, and only the free end of the bimetal 72 is warped, the operating performance of the bimetal is degraded. From the similar reasons, the bimetal needs to be increased in size to allow the bimetal to act as desired, resulting in a limitation to demands for miniaturization of the battery breaker.

SUMMARY OF THE INVENTION

It is an object of the present invention to provide a battery breaker, which may be manufactured to have a smaller size.

Another object of the present invention is to provide a battery breaker, which requires more simple structure for separating a movable contact from a fixed contact depending on a smaller operating amount of a bimetal.

A battery breaker according to the present invention comprises a case, a fixed contact, which is mounted to the inner bottom surface of one end of the case and is connected to a terminal extending from the case outwards, an elastic movable piece, which is mounted such that its tip end protrudes into the case through the other end of the case and allows a movable contact provided at the above tip end to bring into contact with the fixed contact by the spring action, and a convex curved surface-shaped bimetal, which has a warping center located in the substantial center or at a position slightly one-sided from the center, is placed between the movable piece and the inner bottom surface except for the above one end of the case so as to cover a projection provided on the above inner bottom surface without interference of an outer periphery of the bimetal with the inner side surfaces of the case, and is warped at a predetermined working temperature to push up the movable piece for separating the movable contact from the fixed contact, wherein the movable piece has downwardly convex portions brought into contact with the opposite ends of the bimetal when the bimetal is warped.

BRIEF DESCRIPTION OF THE DRAWINGS

The foregoing and other objects and features of the invention will become apparent from the following description of the embodiments of the invention with reference to the accompanying drawings, in which:

FIG. 7 is a plan view showing a lithium ion battery installed with the battery breaker of the first embodiment;

FIG. 8 is a front view showing the lithium ion battery of FIG. 7;

FIG. 15 is a longitudinal cross-sectional view showing the bimetal of FIG. 14;

FIG. 16 is a transverse cross-sectional view showing the bimetal of FIG. 14;

FIG. 17 is a perspective view showing the state of the bimetal of FIG. 14 when warped;

FIG. 18 is a perspective view showing another modification of the bimetal used in the battery breaker of the first embodiment (inclusive of its modifications);

FIG. 38 is a perspective view showing another modification of the bimetal used in the battery breaker of the second embodiment (inclusive of its modifications);

FIG. 45 is a fragmentary enlarged cross-sectional view showing one embodiment of the state of contact between a fixed contact and a movable contact of a battery breaker according to the present invention;

FIG. 46 is a fragmentary enlarged cross-sectional view showing the state of failures when the fixed contact and the movable contact of FIG. 45 are worn;

FIG. 47 is a fragmentary enlarged cross-sectional view showing another embodiment of the state of contact between the fixed contact and the movable contact of the battery breaker according to the present invention;

DETAILED DESCRIPTION OF THE PREFERRED EMBODIMENTS

Figure 1:
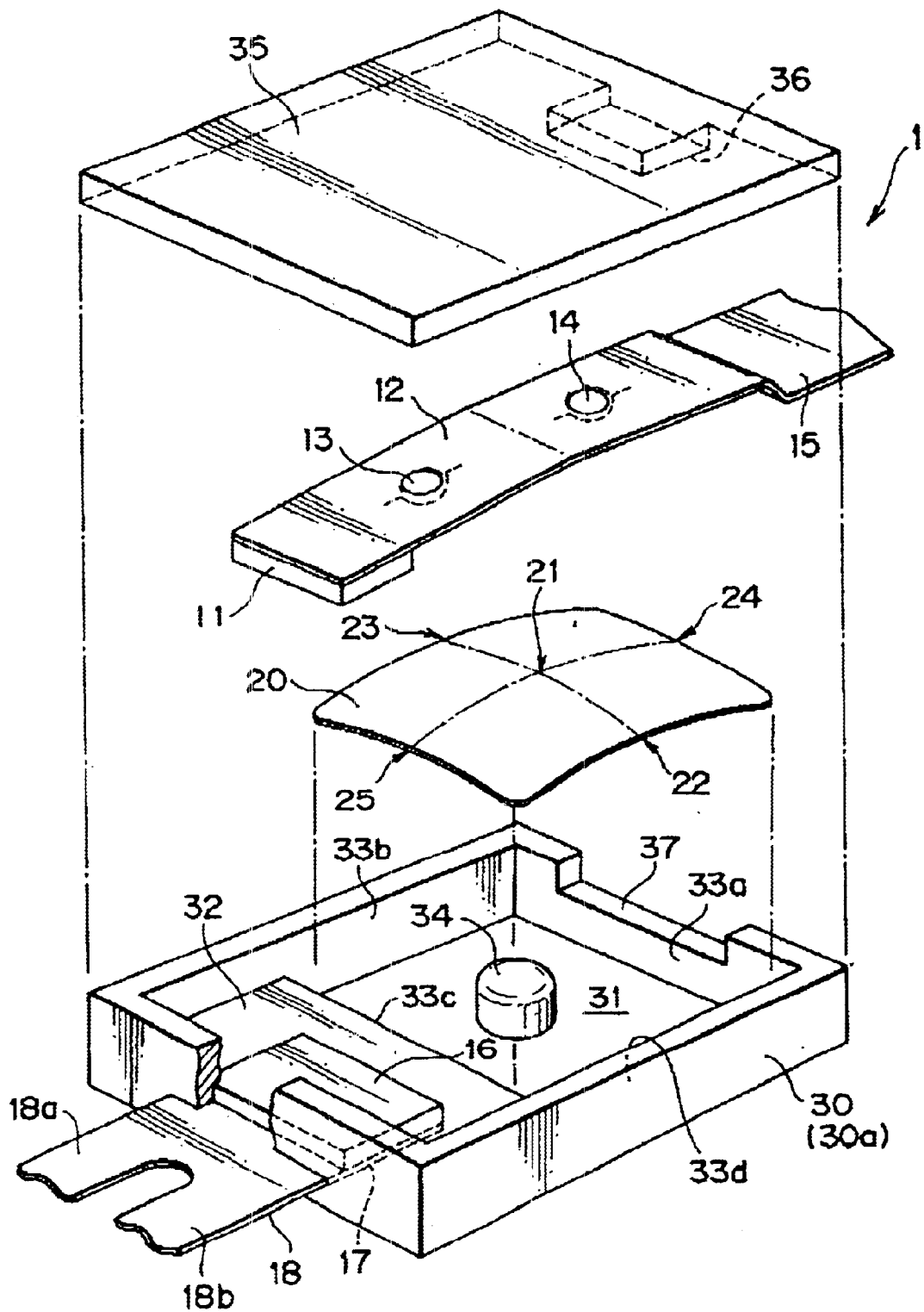
FIG. 1 is an exploded perspective view showing a first embodiment of a battery breaker according to the present invention.

A description will now be given of the first embodiment of the present invention.

A battery breaker 1 comprises a case composed of a housing part 30a and a cover 35 covering the upper surface of the housing part 30a, and a fixed contact 16, a movable contact 11, a movable piece 12 and a bimetal 20, which are housed in the case 30 in the state of being enclosed therein.

The fixed contact 16 is embedded in the inner bottom surface of one end 32 of the case 30 so as to be substantially flush with the inner bottom surface. The fixed contact 16 is connected to a terminal 18 extending from the case 30 outwards through a fixed piece 17 connected to the bottom surface of the fixed contact 16, and the terminal 18 is bifurcated into terminal pieces 18a, 18b.

The band plate-shaped movable piece 12 having elasticity is mounted to the other end 37 of the case 30 as protruding inwards in the state of being lifted up from the inner bottom surface 31 of the case 30 so that the tip end of the movable piece extends to a portion above the fixed contact 16. The movable contact 11 fixed to the under surface of the tip end of the movable piece 12 is pressed to be in contact with the upper surface of the fixed contact 16 by the spring action of the movable piece 12. The movable piece 12 is preferably formed in a gently V-like (inverse V-like) curved or bent shape as shown in the drawing for the purpose of allowing the movable piece 12 to exert its elasticity effectively. The movable piece 12 has a terminal 15 as one body so as to extend from the case 30 outwards.

An inner bottom surface 31 adjacent to one end 32 of the case 30 is slightly lower in level than the inner bottom surface of one end 32 of the case 30, and the upwardly convex curved surface-shaped bimetal 20 is placed between the inner bottom surface 31 and the movable piece 12.

Figure 2:
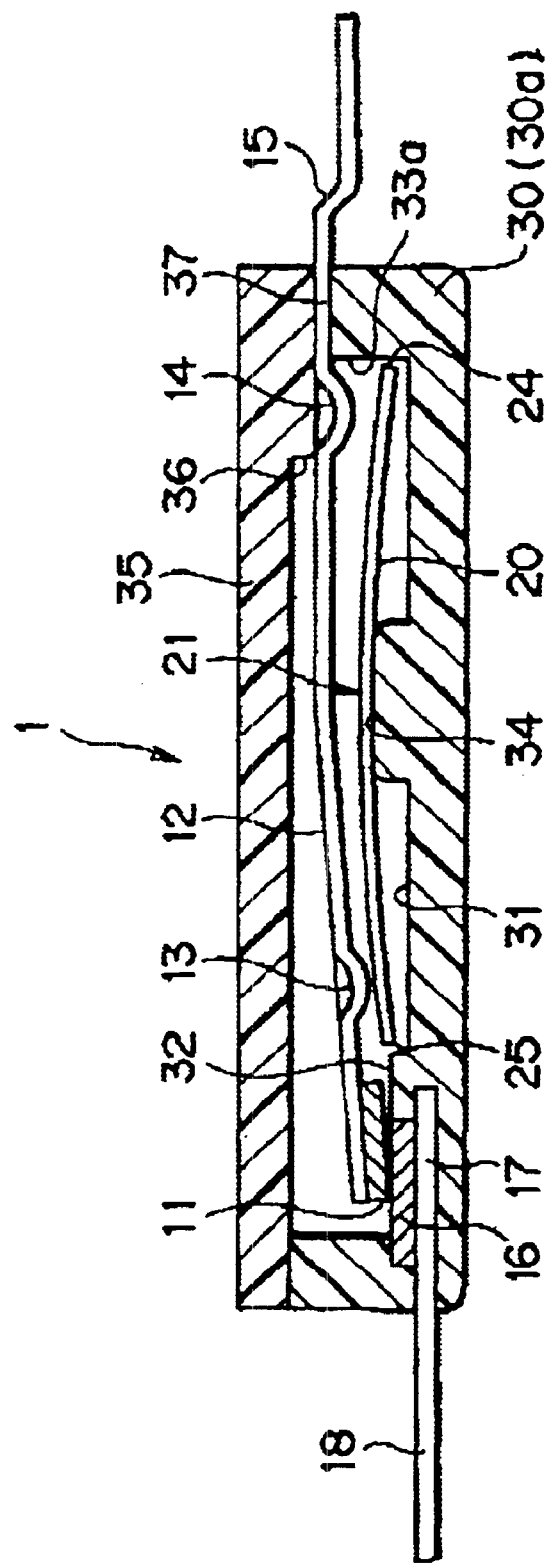
FIG. 2 is a cross-sectional view showing the state of the battery breaker of the first embodiment when assembled.

The bimetal 20 is rectangular in planar shape and has four rounded corners. In addition, the bimetal 20 is similar in planar shape to the inner bottom surface 31 of the case 30 and has a warping center 21 in the substantial center. The bimetal 20 is mounted to cover a projection 34 provided on the inner bottom surface 31 of the case 30 at a position corresponding to the warping center 21 such that an outer periphery of the bimetal is placed at a certain distance from four inner side surfaces 33a, 33b, 33c, 33d of the bottom surface 31 of the case 30 without interfering therewith. In FIG. 2, while the longitudinal ends 24, 25 of the bimetal 20 are slightly raised from the inner bottom surface 31 of the case 30, the bimetal 20 may be also constituted such that the longitudinal ends 24, 25 make contact with the inner bottom surface 31 of the case 30 by reducing a curvature of the bimetal 20. The top of the projection 34 is formed flatly.

The movable piece 12 has downwardly convex portions 13, 14 at portions close to the tip end of the movable piece 12 and on the case-fixed end side thereof so as to face the longitudinal ends 24, 25 of the bimetal 20. When the bimetal 20 is warped to make the snap action at a predetermined working temperature, the longitudinal ends 25, 24 of the bimetal 20 are brought into contact with the respective convex portions 13, 14 of the movable piece 12 to push up the tip end (the free end) of the movable piece 12. The movable piece 12 is constituted such that the rear side of the convex portion 14 on the case-fixed end side of the movable piece 12 is in contact with a convex-shaped support portion 36 provided on the inner surface of the cover 35 of the case 30, providing higher elasticity for pressing the movable contact 11 at the tip end of the movable piece 12 against the fixed contact 16. While the support portion 36 is preferably formed as one body on the inner surface of the cover 35 of the case, an appropriate-sized block mounted to the inner surface of the cover 35 will be also enough.

The larger the planar size of the bimetal 20 is, the warping force of the bimetal 20 is made higher, resulting in more stable warping action with higher accuracy. Thus, the distance between the outer peripheral edge of the bimetal 20 and each of the inner side surfaces 33a to 33d of the inner bottom surface 31 of the case 30 is preferably set to be as small as possible (the planar size of the bimetal 20 is set to be as large as possible), as far as the snap action resulting from warping of the bimetal 20 is carried out smoothly.

The housing part 30a and the cover 35 of the case 30 are molded from a material such as polyphenylenesulfide (PPS), liquid crystal polymer (LCP), polybutyleneterephtalate (PBT) or like highly heat-resistant resins. The housing part 30a of the case 30 is formed by means of insert molding or the like, for instance, such that the fixed contact 16 is substantially flushed with the inner bottom surface of one end 32 of the case 30 as described the above and the fixed contact 16 and the fixed piece 17 are placed in an embedded state. After the bimetal 20 and the movable piece 12 are housed in the housing part 30a molded as described the above as shown in FIG. 2, the housing part 30a and the cover 35 are welded together by means of supersonic wave welding or the like, for instance, to enclose the fixed contact 16, the movable piece 12 and the bimetal 20 in the case 30.

A material of the movable piece 12, the fixed piece 17 and the terminal 18 includes preferably phosphor bronze, more preferably, phosphor bronze containing 8% of phosphorus, for instance. On the other hand, a conductive material such as Cu—Ti alloy, Cu—Be alloy, nickel silver, brass and Cu—Ni—Si alloy is also applicable as the material of these parts.

A material of the movable contact 11 and the fixed contact 16 includes preferably nickel-silver alloy, more preferably, silver alloy containing 10% (mass %: the same will be applied in the following) of nickel, for instance. On the other hand) a contact material such as copper-silver alloy, gold-silver alloy, carbon-Ag alloy and tungsten-silver alloy is also applicable to the material of these parts.

The convex portions 13, 14 of the movable piece 12 are preferably formed by press molding. On the other hand, the convex portions 13, 14 may be molded separately from the movable piece 12, for instance, to weld the molded projections 13, 14 to the predetermined positions of the movable piece 12.

A laminated material composed of a material such as Cu—Ni—Mn alloy for high expansion performance and a material such as Ni—Fe alloy for low expansion performance is used for the bimetal 20, for instance.

Figure 3:
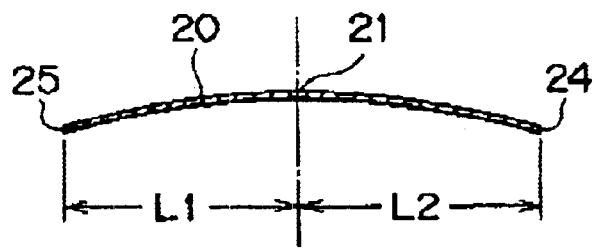
FIG. 3 is a longitudinal cross-sectional view showing a bimetal used in the battery breaker of the first embodiment.
Figure 4:
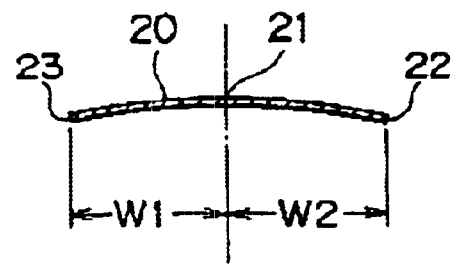
FIG. 4 is a transverse cross-sectional view showing the bimetal of FIG. 3.

The warping center 21 of the bimetal 20 is located in the substantial center of the bimetal 20 as described the above. That is, a shown in FIGS. 3 and 4, a length L1 from one longitudinal end 24 to the warping center 21 of the bimetal 20 is approximately equal to a length L2 from the other longitudinal end 25 to the warping center 21 of the bimetal 20, and a width W1 from one transverse end 22 to the warping center 21 of the bimetal 20 is also approximately equal to a width W2 from the other transverse end 23 to the warping center 21 of the bimetal 20.

Figure 5:
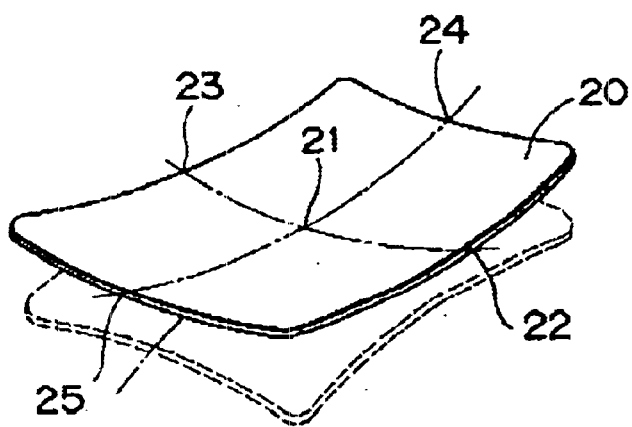
FIG. 5 is a perspective view showing the state of the bimetal of FIG. 3 when warped.

The bimetal 20 is warped at a predetermined working temperature to make the snap action from the state shown by a dotted line to the state shown by a solid line in FIG. 5.

The battery breaker 1 described the above is suitably used as a battery breaker for a lithium ion battery or a nickel hydrogen battery.

FIGS. 7 and 8 show an embodiment of the battery breaker 1 installed to a lithium ion battery 3. The battery breaker 1 is installed to the minus pole side of the lithium ion battery 3 in the state of being mounted to a frame 2, and the terminal 18 on the fixed contact side is connected to the minus pole of the lithium ion battery 3.

Figure 9:
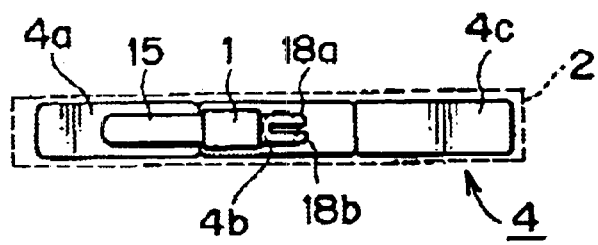
FIG. 9 is a plan view showing a nickel hydrogen battery installed with the battery breaker of the first embodiment.
Figure 10:
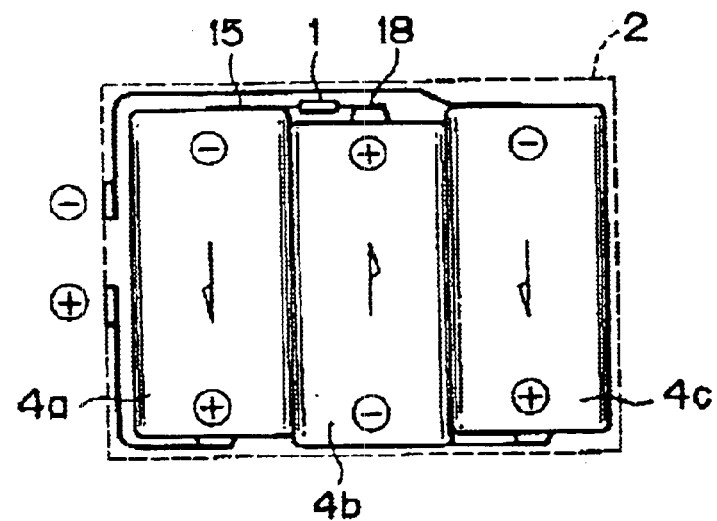
FIG. 10 is a front view showing the nickel hydrogen battery of FIG. 9.

FIGS. 9 and 10 show an embodiment of the battery breaker 1 installed to a battery formed by combining three. pieces of nickel hydrogen batteries 4a, 4b, 4c together. The battery breaker 1 is installed to the minus pole side of the battery 4a on the left side in the drawing and the plus pole side of the battery 4b in the center in the state of being mounted to the frame 2. The terminal 18 at the fixed contact side is connected to the plus pole of the nickel hydrogen battery 4b in the center, and the terminal 15 at the movable contact side is connected to the minus pole of the nickel hydrogen battery 4a on the left side.

A description will now be given of the operations of the above battery breaker 1, together with its effects.

FIG. 2 shows the state of the battery breaker 1 when current is normally flowing between the movable contact 11 and the fixed contact 16 with the movable contact 11 pressed to be in contact with the fixed contact 16 by the elasticity of the movable piece 12.

Figure 6:
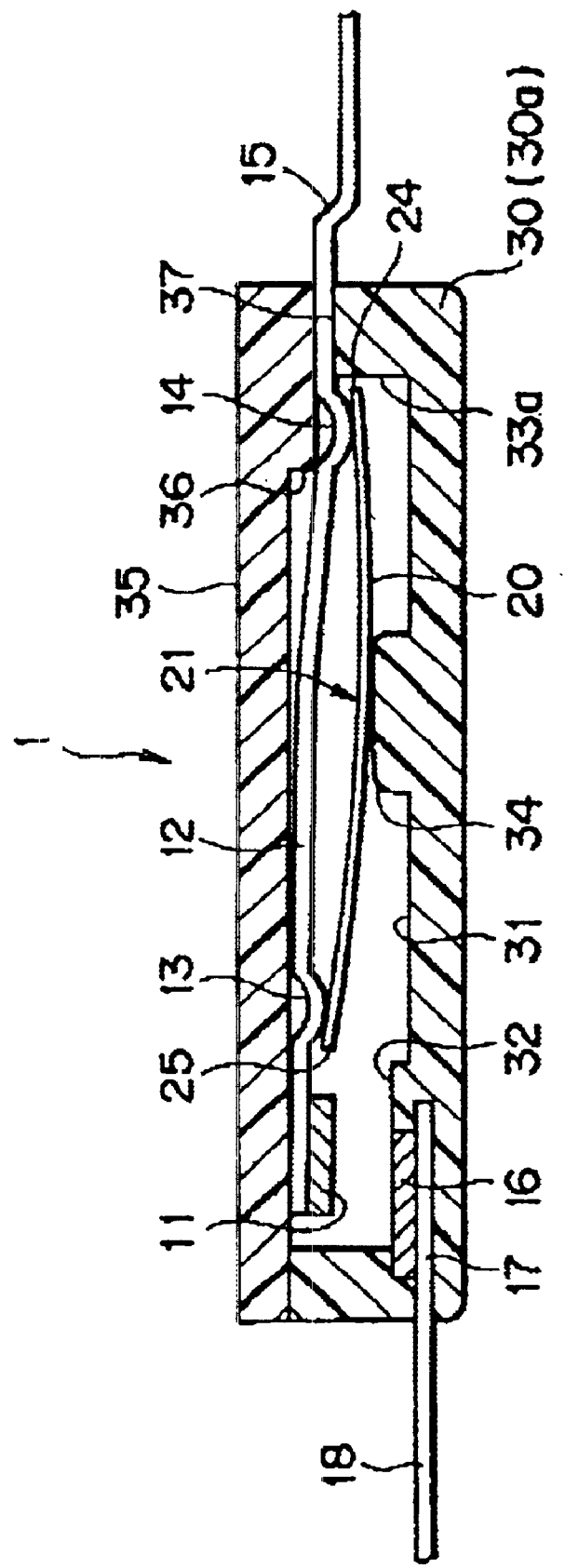
FIG. 6 is a cross-sectional view showing the state of a movable contact of the battery breaker of FIG. 2 when separated from a fixed contact.

When the temperature in the case 30 rises up to the working temperature of the bimetal 20 due to the extraordinary current flow between the contacts 16, 11 or other causes, the bimetal 20 is warped so as to be bent upwards above the projection 34 by the snap action. As the result of being warped, the bimetal 20 is transformed from a convex curved surface shape to a concave curved surface shape as shown in FIG. 6 and is then stretched with a portion being in contact with the top of the projection 34 as a supporting point such that the longitudinal ends 25, 24 are brought into contact with the corresponding projections 13, 14 of the movable piece 12. In this place, the bimetal 20 pushes up the movable contact 11 against the elastic force of the movable piece 12 to separate the movable contact 11 from the fixed contact 16, resulting in disconnection of current flowing between the contacts.

In the battery breaker of the above embodiment, since the convex curved surface-shaped bimetal 20 is placed on the projection 34 formed on the inner bottom surface 31 of the case 30, and the movable piece 12 has the downward projections 13, 14 (facing to the bimetal 20) brought into contact with the opposite ends 25, 24 of the bimetal 20 when the bimetal 20 is warped to make the snap action, the snap action resulting from warping of the bimetal is transmitted to the movable piece 12 efficiently and steadily even if the end 25 of the bimetal 20 is warped at a small stroke. Thus, the movable contact 11 may be separated (disconnected) from the fixed contact 16 efficiently and smoothly by using the bimetal 20 having the small warping stroke (i.e., the bimetal 20 having the relatively small planar size). Then, the battery breaker 1 structured to be capable of separating the movable contact 11 from the fixed contact 16 more rapidly permits a reduction in a period of time of discharge generated when high voltage is applied, resulting in the extended life of the contacts.

Figure 48:
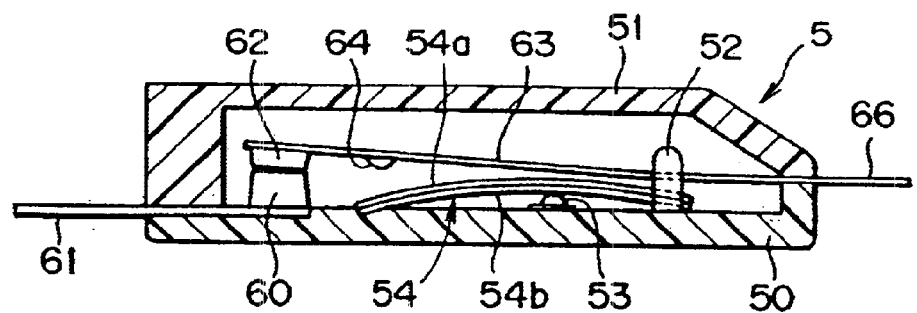
FIG. 48 is a cross-sectional view showing a conventional breaker (a temperature switch)
Figure 49:
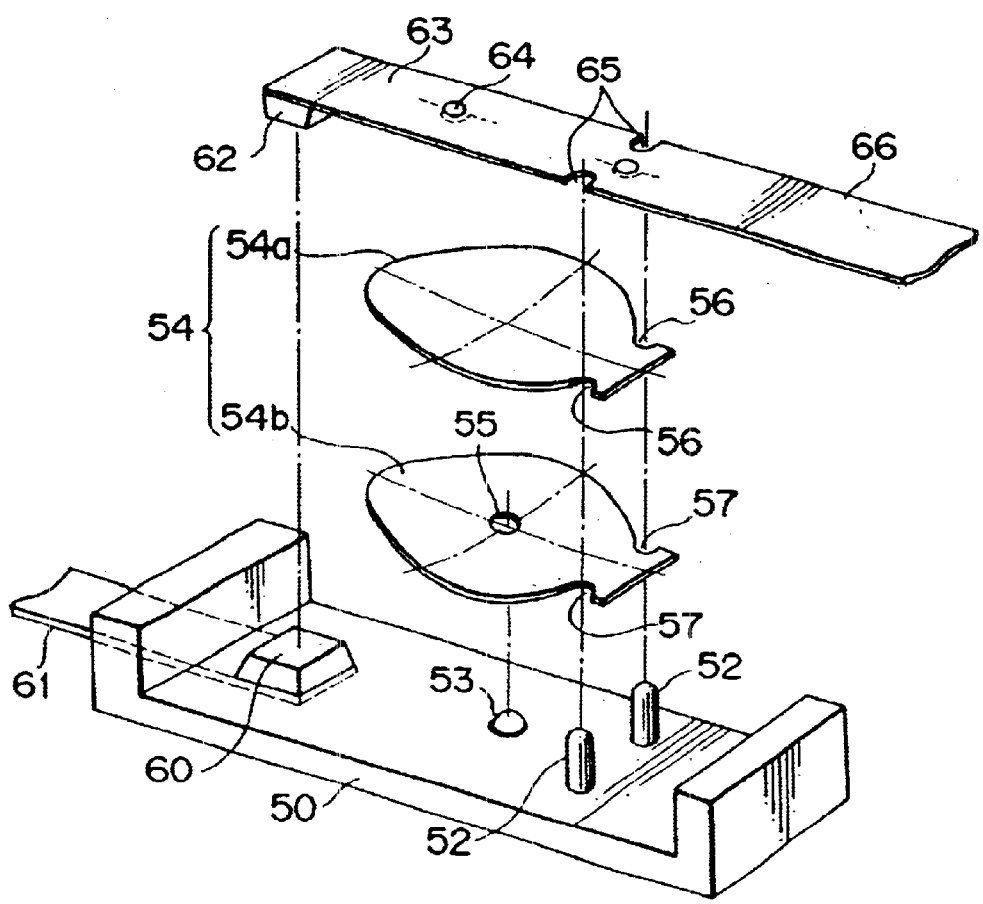
FIG. 49 is an exploded perspective view showing a main part of the breaker of FIG. 48.

On the other hand, in the conventional breaker as shown in FIGS. 48 and 49, for instance, when the bimetal 54 is warped to make the snap action, the snap action of the bimetal 54 is obstructed by frictional slide between the concave semicircular notches 56, 57 of the bimetal 54 and the pins 52, 52 and frictional slide between the notches 65 of the movable piece 63 and the pins 52, 52, resulting in no efficient transmission of the snap action to the movable contact 62 through the movable piece 63. In the conventional breaker shown in FIG. 50, the snap action is also obstructed by frictional slide between the hole of the bimetal 72 and the guide pin 74 and frictional slide between the hole of the movable piece 83 and the guide pin 74, resulting in no efficient transmission of the snap action to the movable contact 82 through the movable piece 83.

Figure 50:
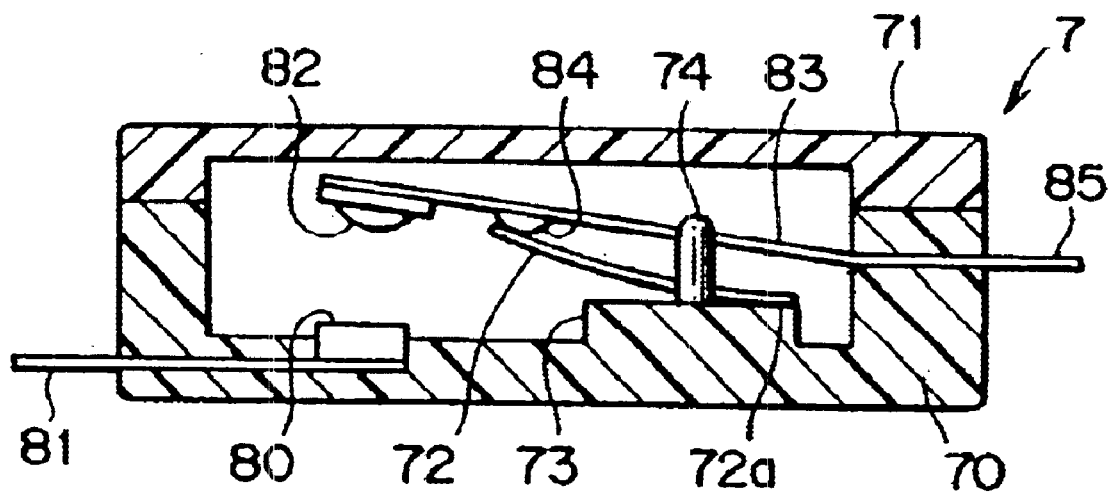
FIG. 50 is a cross-sectional view showing another conventional breaker (a temperature switch).

As compared with the conventional breakers shown in FIGS. 48 to 50, the battery breaker of the above embodiment requires few frictional slide portions of the bimetal 20 relative to other members. Thus, when the bimetal 20 is warped to make the snap action, the snap action of the bimetal 20 is transmitted to the movable piece 12 efficiently and smoothly. In addition, the operating performance of the bimetal 20 is further improved from the similar reasons to the above.

The battery breaker of the above embodiment requires few frictional slide portions of the bimetal 20 relative to other members, and the snap action of the bimetal 20 is transmitted to the movable piece 12 more efficiently as described the above. Accordingly, the battery breaker of the above embodiment requires more simple structure and may be manufactured to have a far smaller size than the conventional breaker as shown in FIGS. 48 and 49. For instance, the battery breaker may be formed to have a thickness (i.e., a thickness from the upper surface to the lower surface of the case 30) of 1.0 mm or less.

Since the battery breaker of the above embodiment does not need to have the notches (the notches 55, 57 of the bimetals 54a. 54b of the breaker shown in FIG. 49, for instance) and the hole (the hole for insertion of the guide pin in the bimetal 72 of the breaker shown in FIG. 50, for instance) in the bimetal 20, cracks hardly occur in the bimetal 20, permitting the life of the battery breaker to be kept more longer.

In the battery breaker of the above embodiment, since the case-fixed end side convex portion 14 of the movable piece 12 is brought into contact with and supported with the support portion 36 provided on the cover 35 of the case 30, the contact pressure between the contacts 16, 11 is increased to reduce the contact electric resistance between both the contacts, resulting in a prevention of an increase in generation of heat between both the contacts.

A description will now be given of a modification of the battery breaker of the first embodiment.

Figure 11:
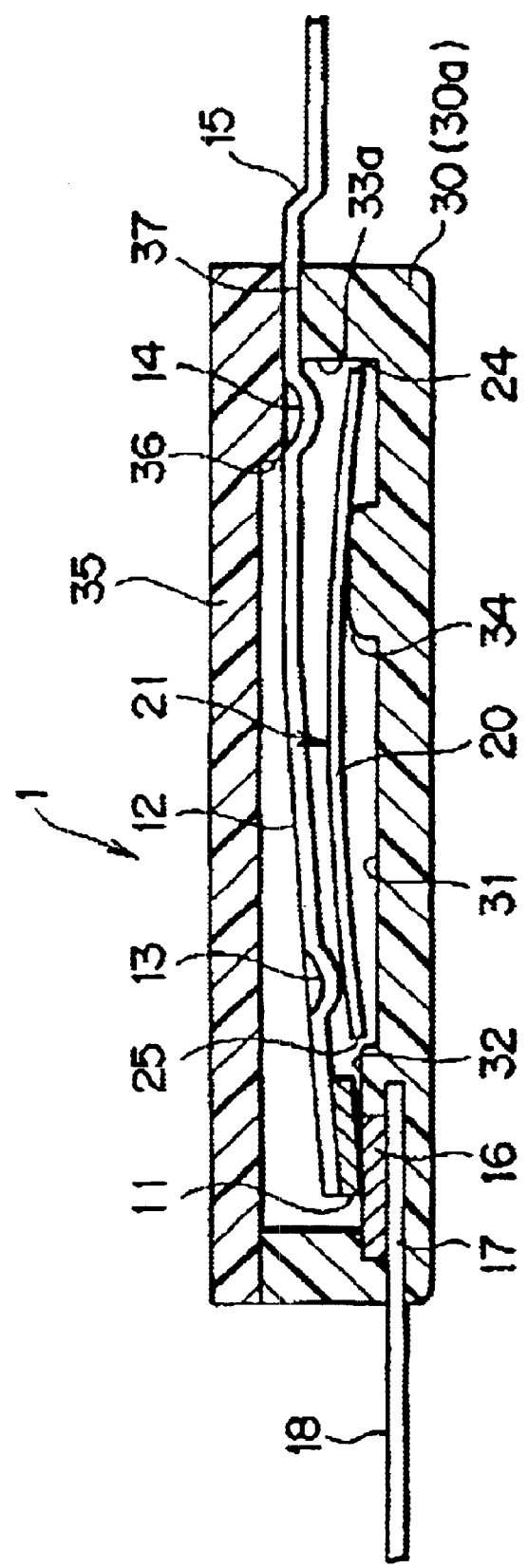
FIG. 11 is a cross-sectional view showing a modification of the battery breaker of the first embodiment.
Figure 12:
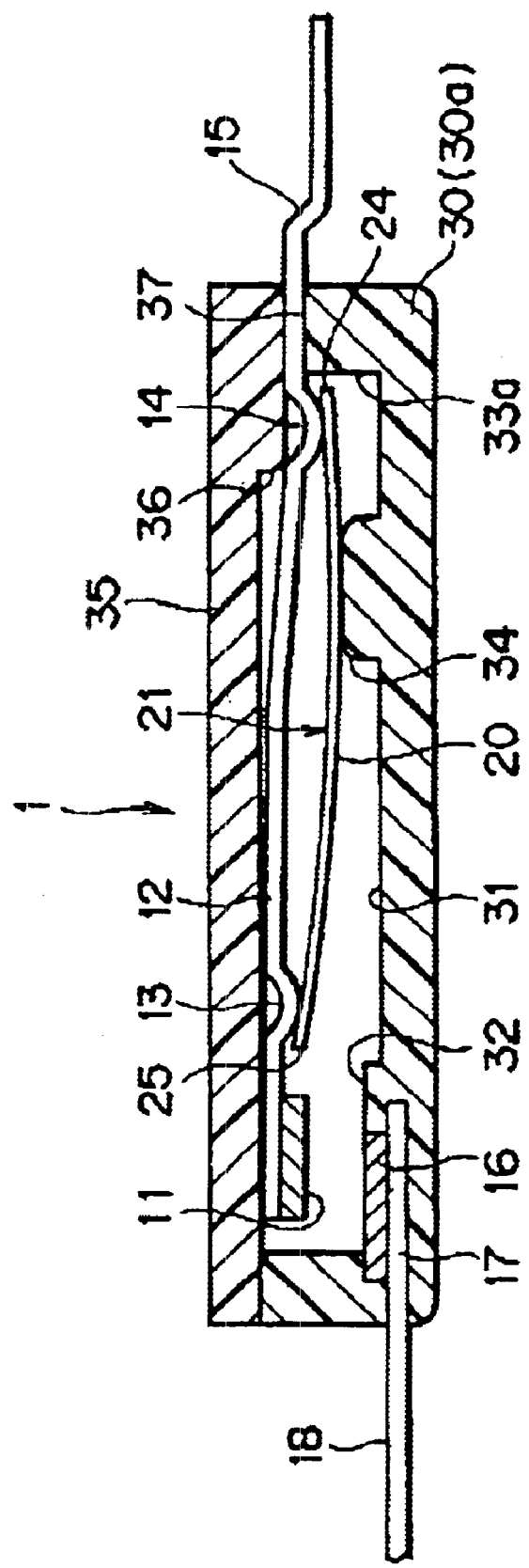
FIG. 12 is a cross-sectional view showing the state of a movable contact of the battery breaker of FIG. 11 when separated from a fixed contact.

FIGS. 11 and 12 show a modification of the battery breaker of the first embodiment.

According to the battery breaker of this modification, the projection 34 on the inner bottom surface 31 of the case 30 is formed at a position corresponding to a portion slightly one-sided from the warping center 21 in the center of the bimetal 20 toward one longitudinal end 24, and the bimetal 20 is placed on the projection 34.

Other constitution of the battery breaker of this modification is substantially similar to that of the battery breaker of FIG. 2, and hence, its description will be omitted.

FIG. 11 shows the state of the battery breaker when current is normally flowing between the movable contact 11 and the fixed contact 16 of the battery breaker with the movable contact 11 being in contact with the fixed contact 16 by the spring action of the movable piece 12.

When the temperature in the case 30 reaches the working temperature of the bimetal 20, the bimetal 20 is warped as shown in FIG. 12. Then, the bimetal 20 is transformed from a convex curved surface shape to a concave curved surface shape by the snap action of the bimetal 20 and is then stretched with a portion being in contact with the projection 34 as a supporting point such that the opposite ends 25, 24 are brought into contact with the corresponding convex. portions 13, 14 of the movable piece 12. In this place, the bimetal 20 pushes up the movable contact 11 against the elastic force of the movable piece 12 to separate the movable contact 11 from the fixed contact 16, resulting in disconnection of current flowing between both the contacts.

Other operations and effects of the battery breaker in this modification are substantially similar to those of the battery breaker of the first embodiment shown in FIG. 2, and hence, their descriptions will be omitted.

A description will now be given of another modification of the battery breaker of the first embodiment.

Figure 13:
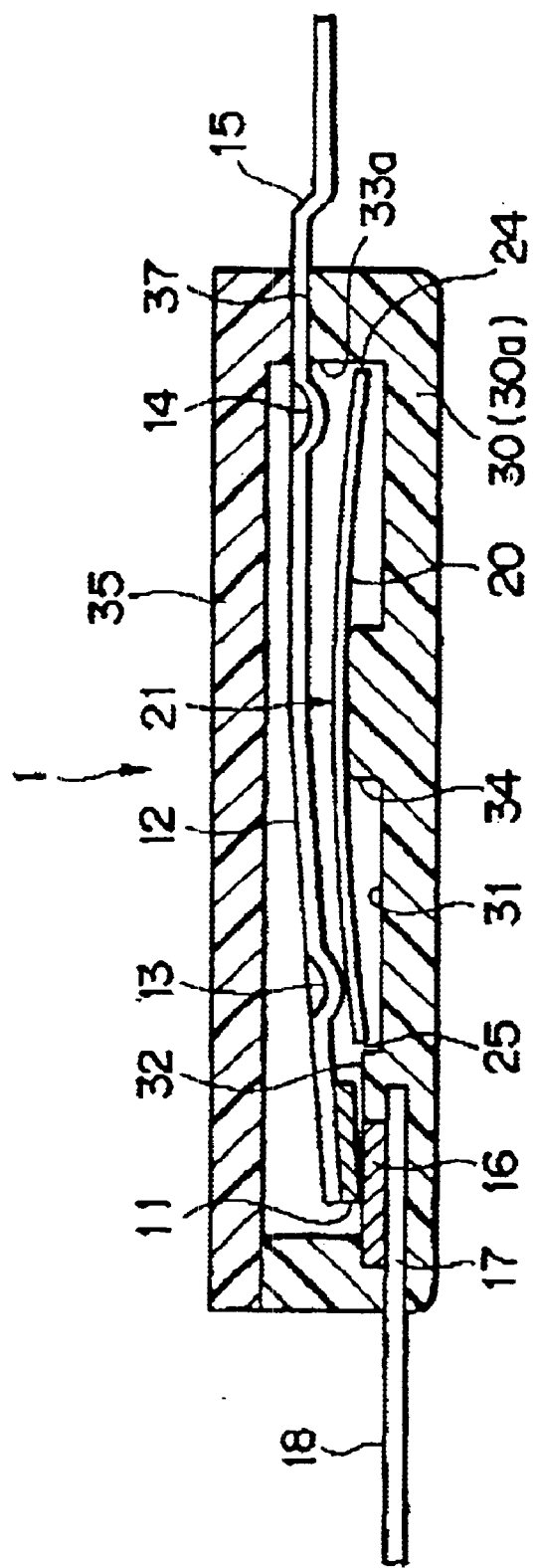
FIG. 13 is a cross-sectional view showing another modification of the battery breaker of the first embodiment.
Figure 14:
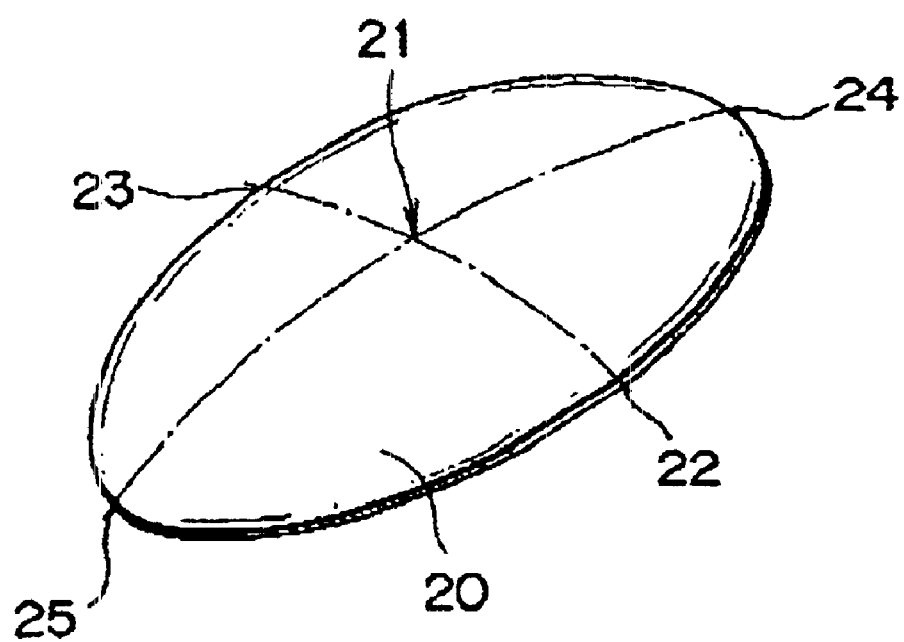
FIG. 14 is a perspective view showing a modification of the bimetal used in the battery breaker of the first embodiment (inclusive of its modifications)

FIG. 13 shows another modification of the battery breaker of the first embodiment.

The battery breaker of this modification is different from the battery breaker of the first embodiment shown in FIG. 2 in that the cover 35 of the case 30 has no support portion brought into contact with the case-fixed end side convex portion 14 of the movable piece 12. On the other hand, other constitution, operations and effects of the battery breaker of this modification are substantially similar to those of the battery breaker of the first embodiment, and hence, their descriptions will be omitted.

A description will now be given of a modification of the bimetal used in the battery breaker of the first embodiment (including its modifications).

FIGS. 14 to 17 show a modification of the bimetal used in the battery breaker of the first embodiment.

The bimetal 20 of this modification is elliptical in planar shape and has a planar size enough to place the bimetal on the projection 34 on the inner bottom surface 31 of the case 30 in the battery breaker of FIG. 1, for instance. That is, the longer diameter (the length from one end 24 to the other end 25) of the bimetal 20 is smaller by an adequate length than the distance between the confronting inner side surfaces 33a, 33c of the inner bottom surface 31 of the case 30 shown in FIG. 1, and the shorter diameter (the length from one end 22 to the other end 23) of the bimetal 20 is smaller by an adequate length than the distance between the confronting inner side surfaces 33b, 33d of the inner bottom surface 31.

Since the warping center 21 of the bimetal 20 is located in the center of the bimetal, the length L1 from one longitudinal end 25 to the warping center 21 is approximately equal to the length L2 from the other longitudinal end 24 to the warping center 21 as shown in FIG. 15, and the width W1 from one transverse end 23 to the warping center 21 is also approximately equal to the width W2 from the other transverse end 22 to the warping center 21 as shown in FIG. 16.

The bimetal 20 of this modification is warped at a temperature more than the predetermined working temperature and makes the snap action so as to be transformed from a convex curved surface shape shown by a dotted line to a concave curved surface shape shown by a solid line in FIG. 17.

A material and other constitution of the bimetal 20 of this modification are similar to those of the bimetal 20 in the battery breaker of FIG. 1.

FIGS. 18 to 21 show another modification of the bimetal used in the battery breaker of the first embodiment.

The bimetal 20 of this modification is approximately crossed in planar shape and has a planar size enough to place the bimetal on the projection 34 on the inner bottom surface 31 of the case 30 in the battery breaker of FIG. 1, for instance. That is, the length from one longitudinal end 24 to the other longitudinal end 25 of the bimetal 20 is smaller by an adequate length than the distance between the confronting inner side surfaces 33a, 33c of the inner bottom surface 31 of the case 30 shown in FIG. 1, and the length from one transverse end 22 to the other transverse end 23 is also smaller by an adequate length than the distance between the confronting inner side surfaces 33b, 33d of the inner bottom surface 31.

Figure 19:
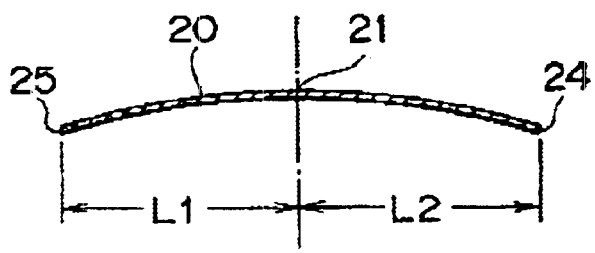
FIG. 19 is a longitudinal cross-sectional view showing the bimetal of FIG. 18.
Figure 20:
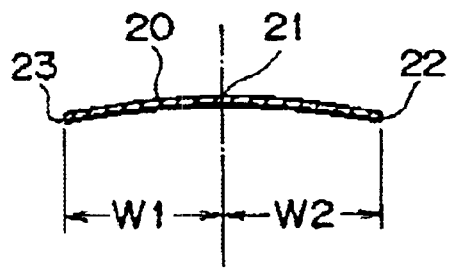
FIG. 20 is a transverse cross-sectional view showing the bimetal of FIG. 18.

Since the warping center 21 of the bimetal 20 is located in the center of the bimetal, the length L1 from one longitudinal end 25 to the warping center 21 is approximately equal to the length L2 from the other longitudinal end 24 to the warping center 21 as shown in FIG. 19, and the width W1 from one transverse end 23 to the warping center 21 is also approximately equal to the width W2 from the other transverse end 22 to the warping center 21 as shown in FIG. 20.

Figure 21:
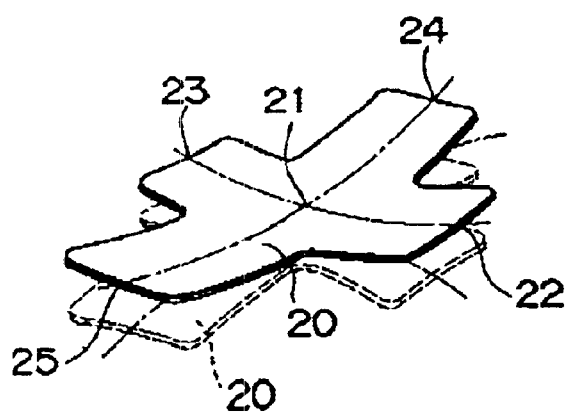
FIG. 21 is a perspective view showing the state of the bimetal of FIG. 18 when warped.

The bimetal 20 of this modification is warped at a temperature more than the predetermined working temperature and makes the snap action so as to be transformed from a convex curved surface shape shown by a dotted line to a concave curved surface shape shown by a solid line in FIG. 21.

A material and other constitution of the bimetal 20 of this modification are similar to those of the bimetal 20 in the battery breaker of FIG. 1.

Figure 22:
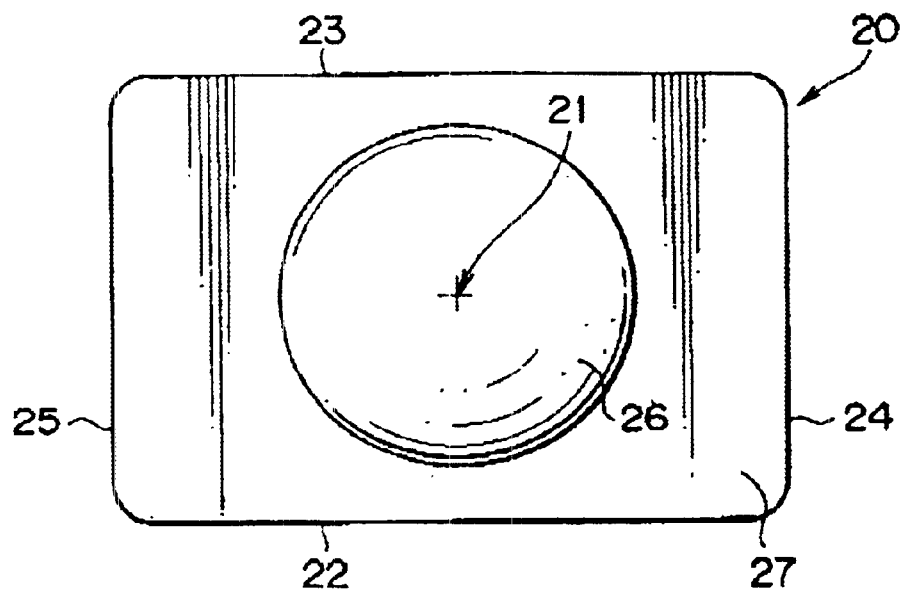
FIG. 22 is a plan view showing a further modification of the bimetal used in the battery breaker of the first embodiment (inclusive of its modifications)
Figure 23:
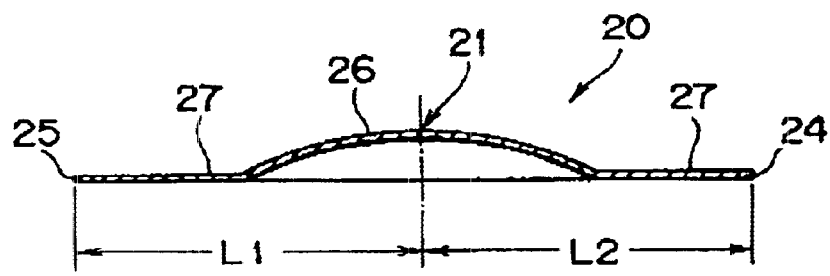
FIG. 23 is a longitudinal cross-sectional view showing the bimetal of FIG. 22.
Figure 24:
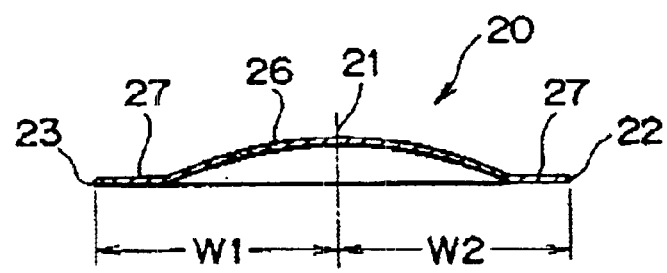
FIG. 24 is a transverse cross-sectional view showing the bimetal of FIG. 22.

FIGS. 22 to 24 show a further modification of the bimetal used in the battery breaker of the first embodiment.

The bimetal 20 of this modification is approximately rectangular in planar shape and has a flat flange portion 27 around a convex semicircular (a convex curved surface-shaped) portion in the center. The bimetal 20 has a planar shape enough to place the bimetal on the projection 34 on the inner bottom surface 31 of the case 30 in the battery breaker shown in FIG. 1, for instance. That is, the length from one longitudinal end 25 to the other longitudinal end 25 of the bimetal 20 is smaller by an adequate length than the distance between the confronting inner side surfaces 33a, 33c of the inner bottom surface 31 of the case 30 of FIG. 1, and the length from one transverse end 22 to the other transverse end 23 is also smaller by an adequate length than the distance between the confronting inner side surfaces 33b, 33d of the inner bottom surface 31.

Since the warping center 21 of the bimetal 20 is located in the center of the bimetal, that is, in the center of the convex semicircular portion 26, the length L1 from one longitudinal end 25 to the warping center 21 is approximately equal to the length L2 from the other longitudinal end 24 to the warping center 21 as shown in FIG. 23, and the width W1 from one transverse end 23 to the warping center 21 is also approximately equal to the width W2 from the other transverse end 22 to the warping center 21 as shown in FIG. 24.

The bimetal 20 of this modification is warped at a temperature more than the predetermined working temperature and makes the snap action to transform the convex semicircular portion 26 into a concave semicircular shape.

A material and other constitution of the bimetal 20 of this modification are similar to those of the bimetal 20 in the battery breaker of FIG. 1.

A description will now be given of a second embodiment of the battery breaker of the present invention.

FIGS. 25 to 30 show a battery breaker 1 of the second embodiment according to the present invention.

In the battery breaker of the second embodiment, while the bimetal 20 is substantially similar in planar shape to the bimetal 20 in the battery breaker 1 of the first embodiment, the warping center 21 of the bimetal 20 in the second embodiment is slightly one-sided from the center toward the longitudinal end 24. On the other hand, the projection 34 for supporting (placing) the bimetal 20 is formed on the inner bottom surface 31 in a portion except for one end 32 of the case 30 as being located at a position corresponding to the warping center 21 of the bimetal 20. That is, the projection 34 is formed at a position slightly one-sided from the center of the inner bottom surface 31 toward the inner side surface 33a, and the bimetal 20 is placed on the projection 34 such that the warping center 21 of the bimetal is located in the substantial center of the projection 34.

Figure 27:
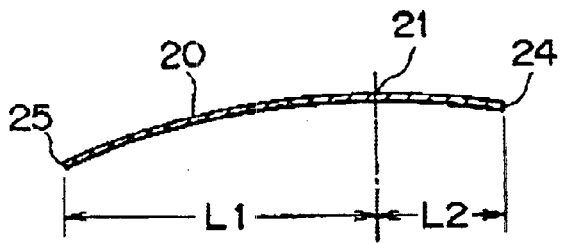
FIG. 27 is a longitudinal cross-sectional view showing a bimetal used in the battery breaker of the second embodiment.
Figure 28:
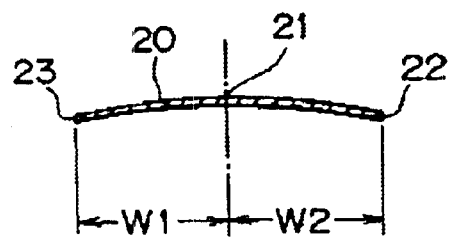
FIG. 28 is a transverse cross-sectional view showing the bimetal of FIG. 27.

The warping center 21 of the bimetal 20 is slightly one-sided from the center toward one end 24 in the longitudinal direction, whereas being located in the substantial center in the transverse direction. Thus, as shown in FIG. 27, the length L2 from the warping center 21 to one longitudinal end 24 of the bimetal 20 is smaller than the length L1 from the warping center 21 to the other longitudinal end 25. On the other hand, the width W1 from one transverse end 23 to the warping center 21 is approximately equal to the width W2 from the other transverse end 22 to the warping center 21, as shown in FIG. 28.

Figure 29:
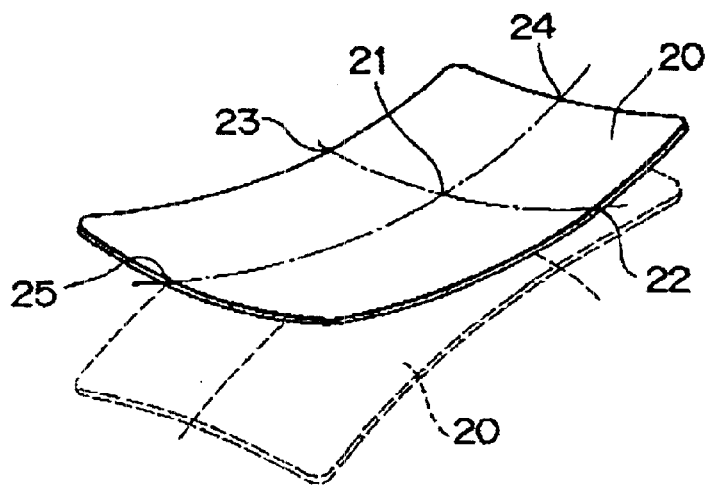
FIG. 29 is a perspective view showing the state of the bimetal of FIG. 27 when warped.

The bimetal 20 in the second embodiment is warped at a temperature more than the predetermined working temperature and makes the snap action so as to be transformed from a convex curved surface shape shown by a dotted line to a concave curved surface shape shown by a solid line in FIG. 29.

Other constitution of the battery breaker of the second embodiment is substantially similar to that of the battery breaker of the first embodiment, and hence, its description will be omitted.

Figure 26:
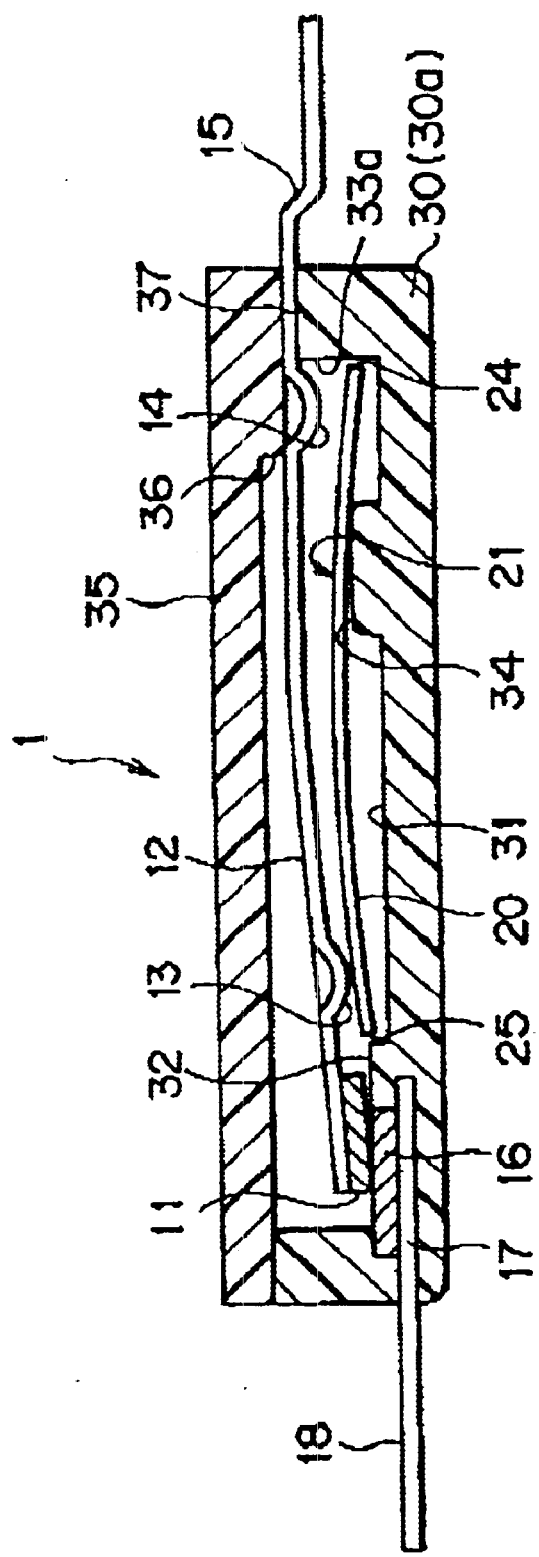
FIG. 26 is a cross-sectional view showing the state of the battery breaker of the second embodiment when assembled.

FIG. 26 shows the state of the battery breaker when current is normally flowing between the movable contact 11 and the fixed contact 16 with the movable contact 11 being pressed to be in contact with the fixed contact 16 by the elasticity of the movable piece 12.

Figure 30:
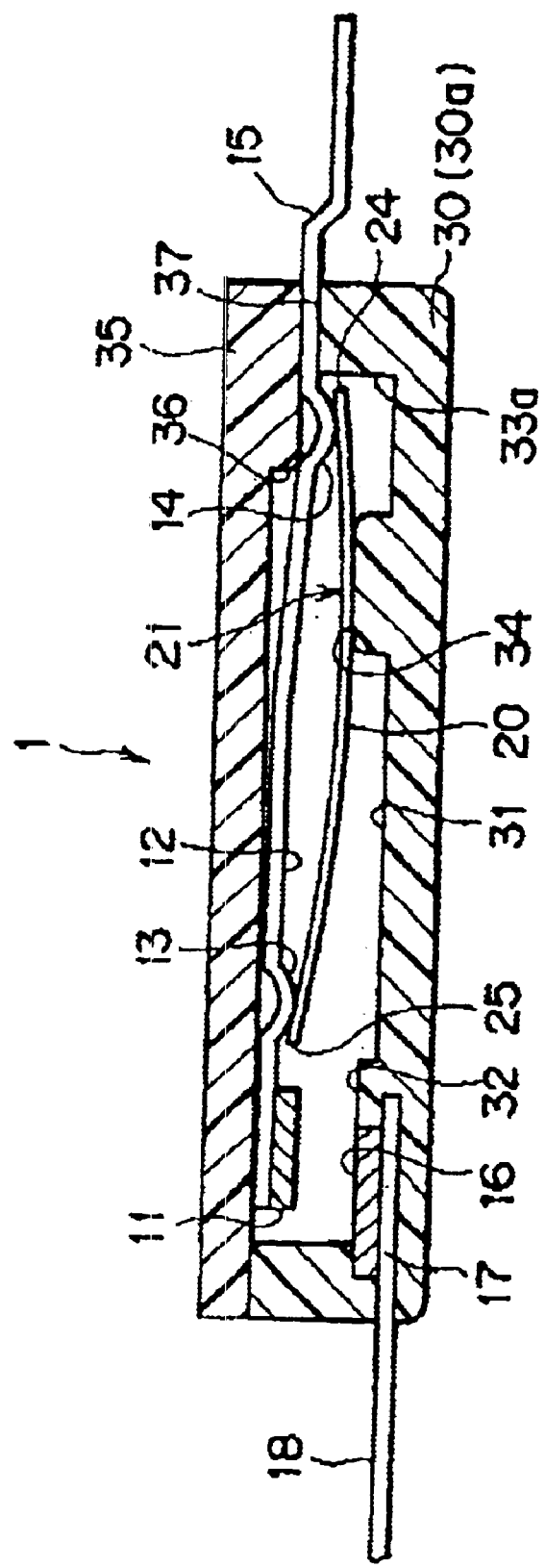
FIG. 30 is a cross-sectional view showing the state of a movable contact of the battery breaker of FIG. 26 when separated from a fixed contact.

When the temperature in the case 30 rises up to the working temperature of the bimetal 20 due to the extraordinary current flow between the contacts 16 and 11 or other causes, the bimetal 20 is warped so as to be bent upwards above the projection 34 by the snap action. As the result of being warped as described the above, the bimetal 20 is transformed from a convex curved surface shape to a concave curved surface shape as shown in FIG. 30 and is then stretched with the portion being in contact with the top of the projection 34 as a supporting point such that the longitudinal ends 25, 24 are brought into contact with the corresponding convex portions 13, 14 of the movable piece 12. In this place, the bimetal 20 pushes up the movable contact 11 against the elastic force of the movable piece 12 to separate the movable contact 11 from the fixed contact 16, resulting in disconnection of current flowing between both the contacts.

Other operations and effects of the battery breaker of the second embodiment are similar to those of the battery breaker of the first embodiment, and hence, their descriptions will be omitted.

A description will now be given of a modification of the battery breaker of the second embodiment.

Figure 31:
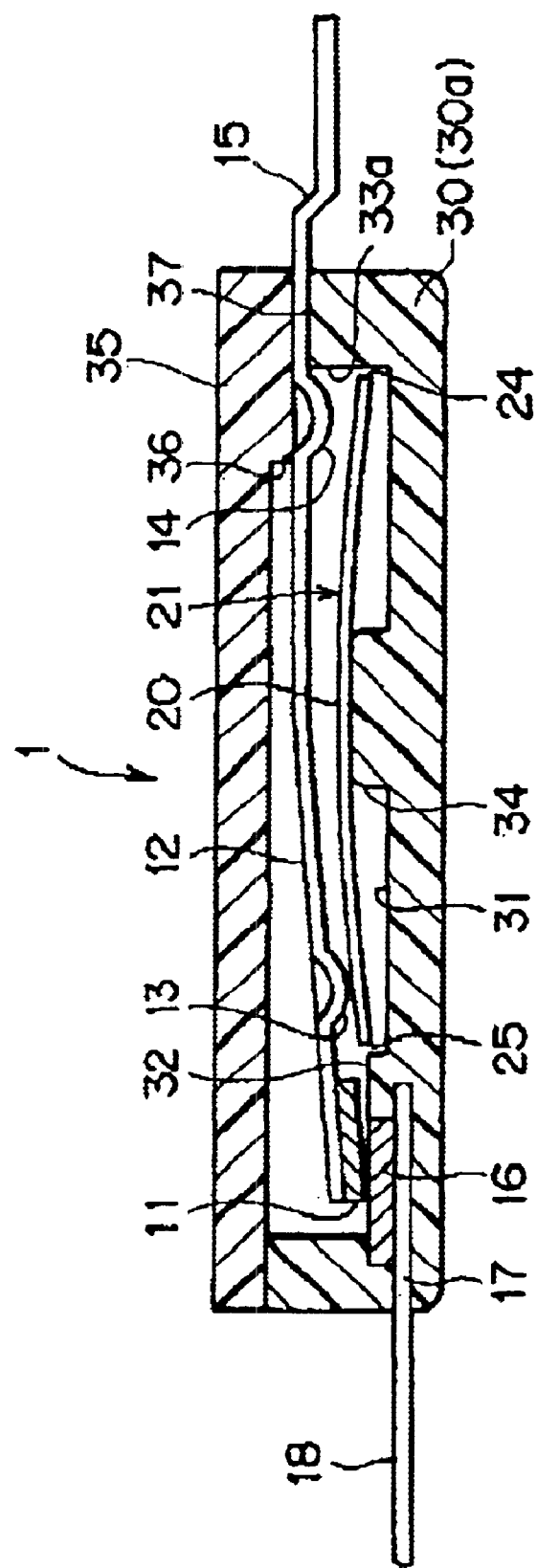
FIG. 31 is a cross-sectional view showing a modification of the battery breaker of the second embodiment.
Figure 32:
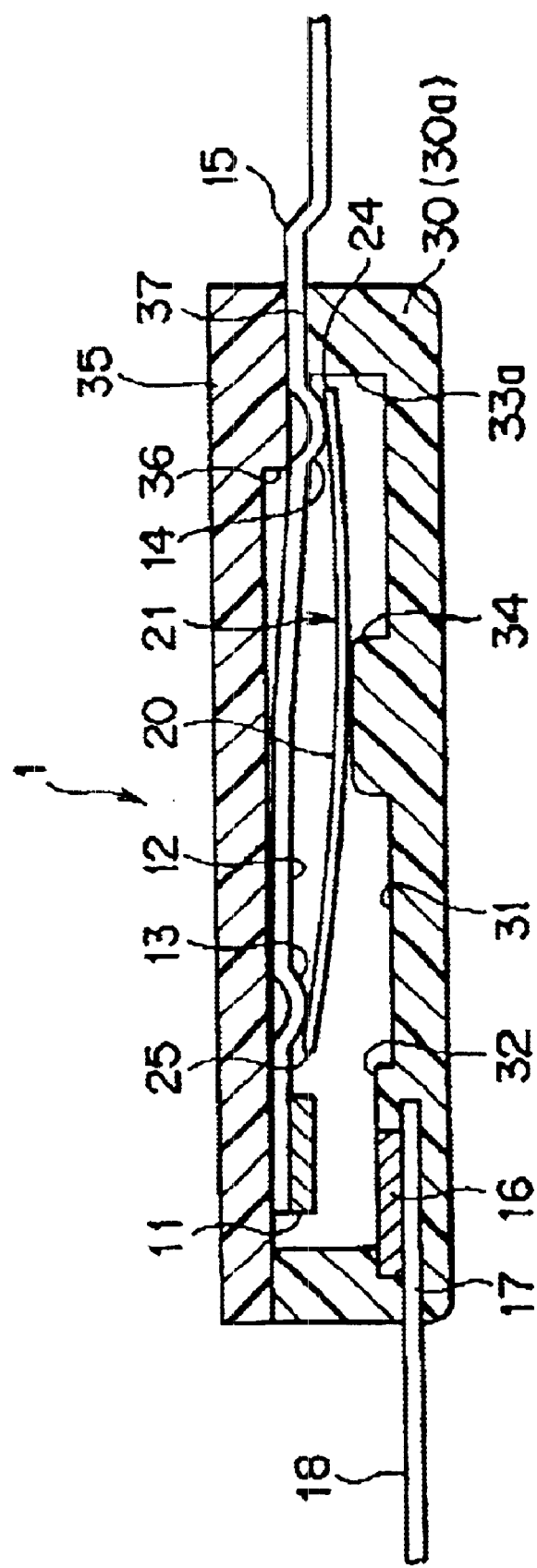
FIG. 32 is a cross-sectional view showing the state of a movable contact of the battery breaker of FIG. 31 when separated from a fixed contact.

FIGS. 31 and 32 show a modification of the battery breaker of the second embodiment.

In the battery breaker of this modification, the projection 34 on the inner bottom surface 31 of the case 30 is formed at a position corresponding to a portion slightly one-sided from the one-sided warping center 21 of the bimetal 20 toward one longitudinal end 25, that is, at a position corresponding to the center of the bimetal 20, and the bimetal 20 is placed on the projection 34.

Other constitution of the battery breaker of this modification is substantially similar to that of the battery breaker shown in FIG. 26, and hence, its description will be omitted.

FIG. 31 shows the state of the battery breaker when current is normally flowing between the movable contact 11 and the fixed contact 16 with the movable contact being in contact with the fixed contact 16 by the spring action of the movable piece 12.

When the temperature in the case 30 reaches a temperature more than the working temperature of the bimetal 20, the bimetal 20 is warped as shown in FIG. 32. Then, the bimetal 20 is transformed from a convex curved surface shape to a concave curved surface shape by the snap action of the bimetal and is then stretched with a portion being in contact with the top of the projection 34 as a supporting point such that the opposite ends 25, 24 are brought into contact with the corresponding convex portions 13, 14 of the movable piece 12. In this place, the bimetal 20 pushes up the movable contact 11 against the elastic force of the movable piece 12 to separate the movable contact 11 from the fixed contact 16, resulting in disconnection of the current flowing between both the contacts.

Other operations and effects of the battery breaker of this modification are substantially similar to those of the battery breaker of the second embodiment shown in FIG. 26, and hence, their descriptions will be omitted.

A description will now be given of another modification of the battery breaker of the second embodiment.

Figure 33:
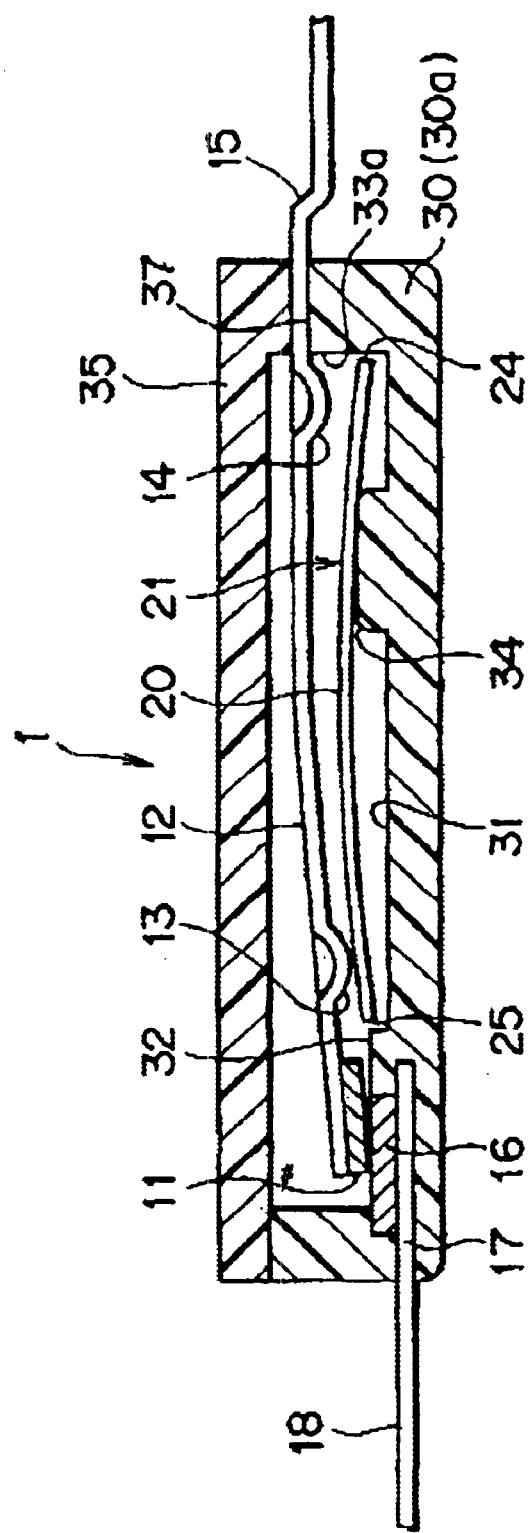
FIG. 33 is a cross-sectional view showing another modification of the battery breaker of the second embodiment.
Figure 34:
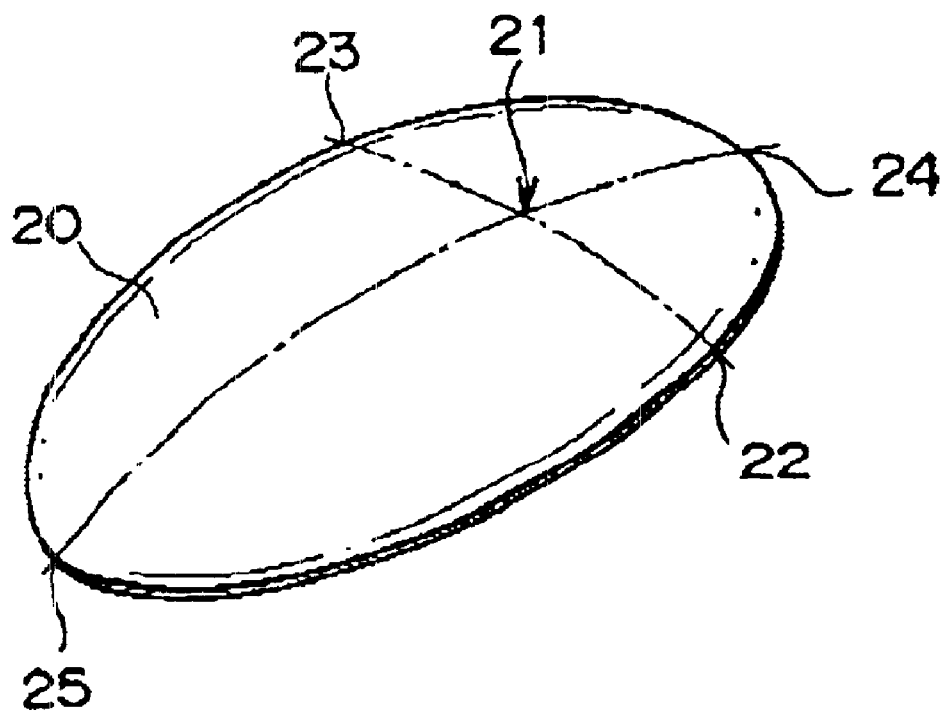
FIG. 34 is a perspective view showing a modification of the bimetal used in the battery breaker of the second embodiment (inclusive of its modifications)

FIG. 33 shows another modification of the battery breaker of the second embodiment.

The battery breaker of this modification is different from the battery breaker of the second embodiment shown in FIG. 26 in that the cover 35 of the case 30 in this battery breaker has no support portion brought into contact with the case-fixed end side convex portion 14 of the movable piece 12. On the other hand, other constitution, operations and effects of the battery breaker of this modification are similar to those of the battery breaker of the second embodiment, and hence, their descriptions will be omitted.

A description will now be given of a modification of the bimetal used in the battery breaker of the second embodiment (including its modifications).

FIGS. 34 to 37 show a modification of the bimetal used in the battery breaker of the second embodiment.

Figure 25:
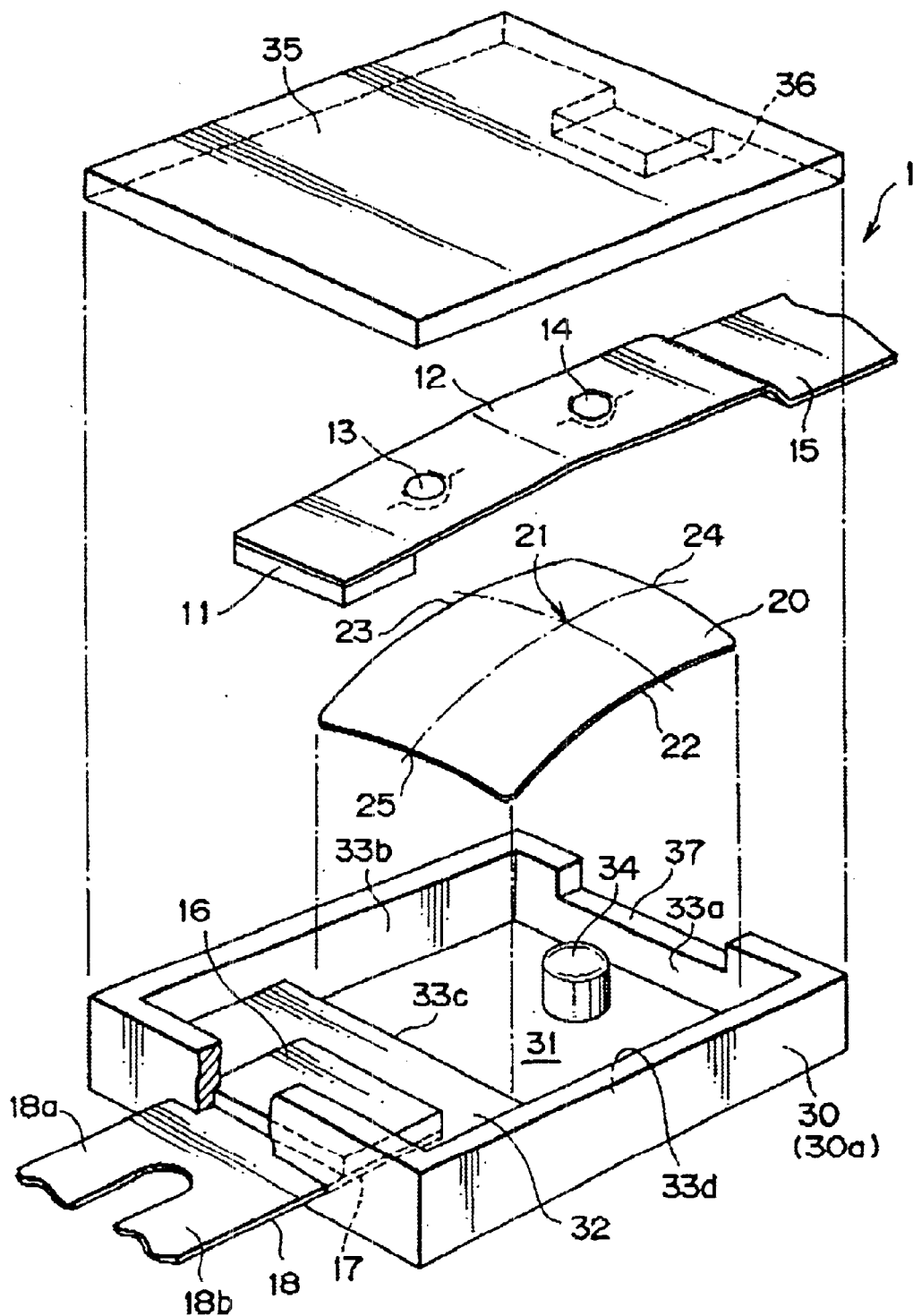
FIG. 25 is an exploded perspective view showing a second embodiment of a battery breaker according to the present invention.

The bimetal 20 of this modification is elliptical in planar shape and has a planar size enough to place the bimetal on the projection 34 on the inner bottom surface 31 of the case 30 in the battery breaker of FIG. 25, for instance. That is, the longer diameter (the length from one end 24 to the other end 25) of the bimetal 20 is smaller by an adequate length than the distance between the confronting inner side surfaces 33a, 33c of the inner bottom surface 31 of the case 30 as shown in FIG. 25, and the shorter diameter (the length from one end 22 to the other end 23) of the bimetal 20 is also smaller by an adequate length than the distance between the confronting inner side surfaces 33b, 33d of the inner bottom surface 31.

Figure 35:
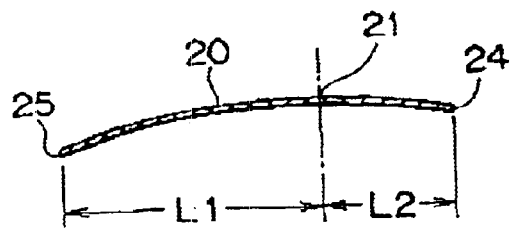
FIG. 35 is a longitudinal cross-sectional view showing the bimetal of FIG. 34.
Figure 36:
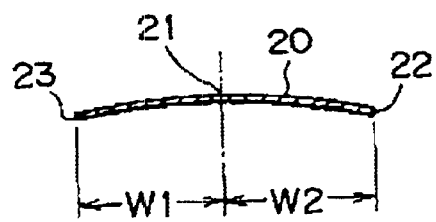
FIG. 36 is a transverse cross-sectional view showing the bimetal of FIG. 34.

Since the warping center 21 of the bimetal 20 is slightly one-sided from the center of the bimetal only in the longitudinal direction, the length L2 from the warping center 21 to one longitudinal end 25 is smaller than the length L2 from the warping center 21 to the other longitudinal end 25, as shown in FIG. 35. On the other hand, the width W1 from one transverse end 23 to the warping center 21 is approximately equal to the width W2 from the other transverse end 22 to the warping center 21, as shown in FIG. 36.

Figure 37:
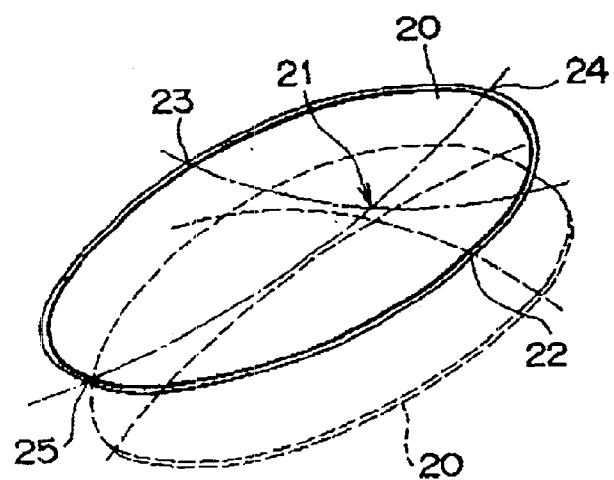
FIG. 37 is a perspective view showing the state of the bimetal of FIG. 34 when warped.

The bimetal 20 of this modification is warped at a temperature more than the predetermined working temperature and then makes the snap action so as to be transformed from a convex curved surface shape shown by a dotted line to a concave curved surface shape shown by a solid line in FIG. 37.

A material and other constitution of the bimetal 20 of this modification are similar to those of the bimetal 20 in the battery breaker of FIG. 25.

FIGS. 38 to 41 show another modification of the bimetal used in the battery breaker of the second embodiment.

The bimetal 20 of this modification is approximately crossed in planar shape and has a planar size enough to place the bimetal on the projection 34 on the inner bottom surface 31 of the case 30 in the battery breaker of FIG. 25, for instance. That is, the length from one longitudinal end 24 to the other longitudinal end 25 of the bimetal 20 is smaller by an adequate length than the distance between the confronting inner side surfaces 33a, 33c of the inner bottom surface 31 of the case 30 as shown in FIG. 25, and the length from one transverse end 22 to the other transverse end 23 of the bimetal is also smaller by an adequate length than the distance between the confronting inner side surfaces 33b, 33d of the inner bottom surface 31.

Figure 39:
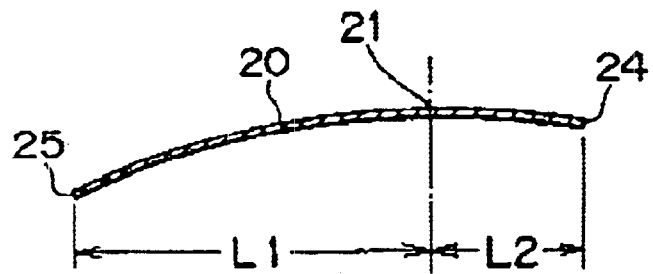
FIG. 39 is a longitudinal cross-sectional view showing the bimetal of FIG. 38.
Figure 40:
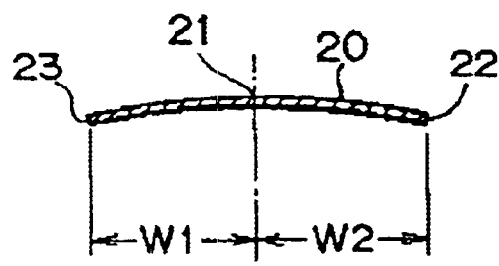
FIG. 40 is a transverse cross-sectional view showing the bimetal of FIG. 38.

Since the warping center 21 of the bimetal 20 is slightly one-sided from the center of the bimetal only in the longitudinal direction, the length L2 from the warping center 21 to one longitudinal end 24 is smaller than the length L1 from the warping center 21 to the other longitudinal end 25, as shown in FIG. 39. On the other hand, the width W1 from one transverse end 23 to the warping center 21 is approximately equal to the width W2 from the other transverse end 22 to the warping center 21, as shown in FIG. 40.

Figure 41:
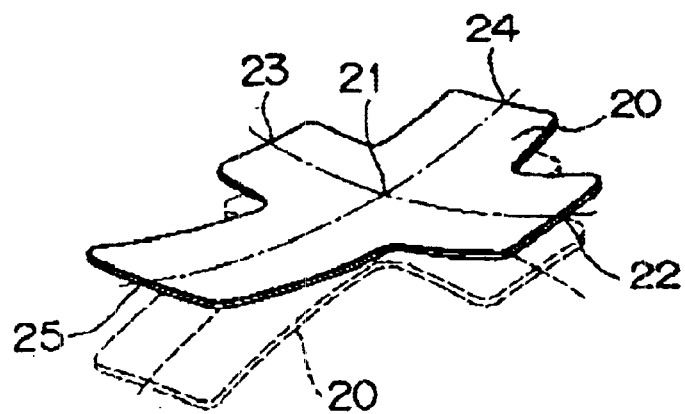
FIG. 41 is a perspective view showing the state of the bimetal of FIG. 38 when warped.

The bimetal 20 of this modification is warped at a temperature more than the predetermined working temperature and makes the snap action so as to be transformed from a convex curved surface shape shown by a dotted line to a concave curved surface shape shown by a solid line in FIG. 41.

A material and other constitution of the bimetal 20 of this modification are similar to those of the bimetal 20 in the battery breaker shown in FIG. 25.

Figure 42:
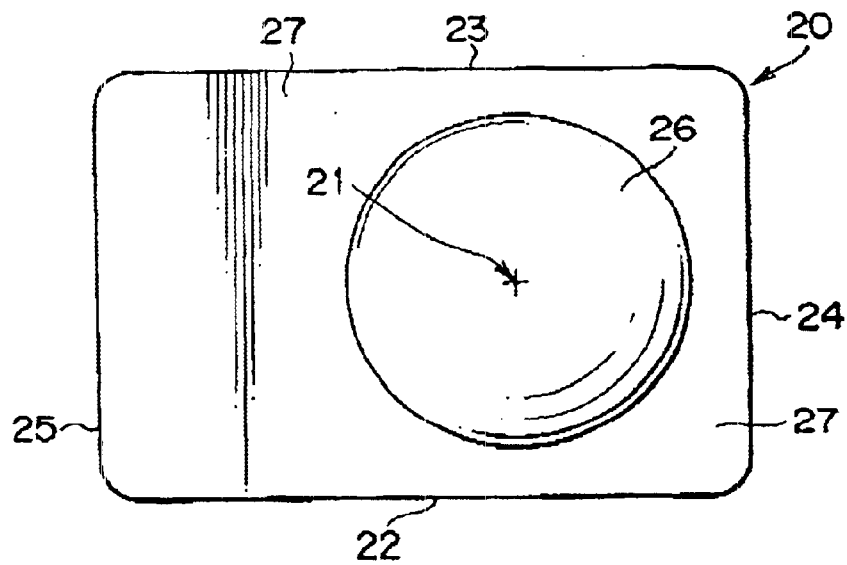
FIG. 42 is a plan view showing a further modification of the bimetal used in the battery breaker of the second embodiment (inclusive of its modifications)
Figure 43:
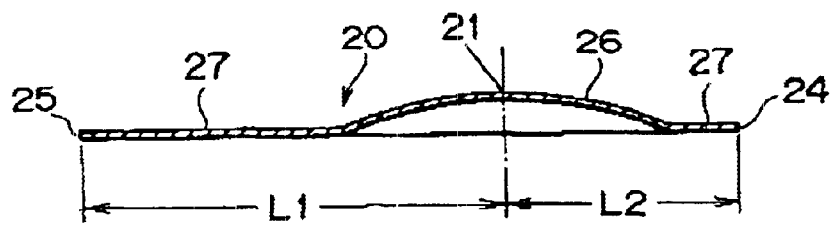
FIG. 43 is a longitudinal cross-sectional view showing the bimetal of FIG. 42.
Figure 44:
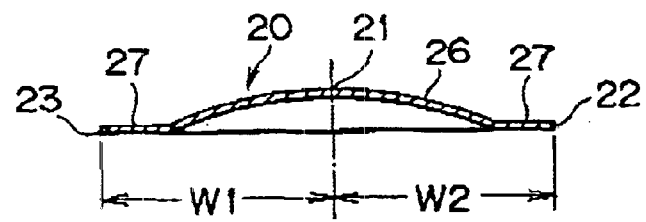
FIG. 44 is a transverse cross-sectional view showing the bimetal of FIG. 42.

FIGS. 42 to 44 show a further modification of the bimetal used in the battery breaker of the second embodiment.

The bimetal 20 of this modification is approximately rectangular in planar shape and has a flat flange portion 27 around a convex semicircular (a convex curved surface-shaped) portion 26 formed at a portion one-sided from the center toward one longitudinal end 24. This bimetal 20 has a planar size enough to place the bimetal on the projection 34 on the inner bottom surface 31 of the case 30 in the battery breaker shown in FIG. 25, for instance. That is, the length from one longitudinal end 24 to the other longitudinal end 25 of the bimetal 20 is smaller by an adequate length than the distance between the confronting inner side surfaces 33a, 33c of the inner bottom surface 31 of the case 30 shown in FIG. 25, and the length from one transverse end 22 to the other transverse end 23 of the bimetal is also smaller by an adequate length than the distance between the confronting inner side surfaces 33b, 33d of the inner bottom surface 31.

Since the warping center 21 of the bimetal 20 is one-sided from the center of the bimetal toward one longitudinal end 24, that is, located in the center of the convex semicircular portion 26 one-sided toward one longitudinal end 24, the length L2 from the warping center 21 to one longitudinal end 24 is smaller than the length L1 from the warping center 21 to the other longitudinal end 25, as shown in FIG. 43. On the other hand, the width W1 from one transverse end 23 to the warping center 21 is approximately equal to the width W2 from the other transverse end 22 to the warping center 21, as shown in FIG. 44.

The bimetal 20 of this modification is warped at a temperature more than the predetermined working temperature and then makes the snap action so as to transform the convex semicircular portion into a concave semicircular shape.

A material and other constitution of the bimetal 20 of this modification are similar to those of the bimetal 20 in the battery breaker shown in FIG. 25.

A description will now be given of another embodiment of a contact portion of the contacts.

FIG. 45 shows another preferred embodiment of a contact portion of the movable contact 11 with the fixed contact 16 in the battery breaker according to the present invention.

According to the constitution of the contact portion in this embodiment, the fixed contact 16 is placed such that its upper surface is substantially flushed with the inner bottom surface of one end 32 of the case 30, while a tip angular portion 11a of the movable contact 11 is brought into contact with the flat upper surface of the fixed-contact 16 at a relatively sharp angle as shown in FIG. 45 by slightly making a gently V-shaped (inverse V-shaped) bending angle of the movable piece 12 smaller, for instance.

With the above constitution, when a contact surface 16a of the fixed contact 16 and the tip angular portion 11a of the movable contact 11 are worn or melted out to bring about the extraordinary state as shown in FIG. 46, the under surface portion of the movable contact 11 butts against a boundary 32a between the fixed contact 16 and the inner bottom surface of one end 32 of the case 30, resulting in obstruction to contact between the contacts 16, 11, that is, to current flowing between the contacts.

That is, the above constitution makes it possible to keep both the contacts 11, 16 to be opened for preventing the occurrence of short circuit, when the contact portion between the contacts 16, 11 is worn to place the battery breaker in a failure mode.

FIG. 47 shows a further preferable embodiment of the contact portion of the movable contact 11 with the fixed contact 16.

According to the constitution of the contact portion in the embodiment shown in FIG. 47, the fixed contact 16 is placed such that its upper surface is substantially flushed with the inner bottom surface of one end 32 of the case 30, while the tip end angular portion 11a of the movable contact 11 is brought into contact with the flat upper surface of the fixed contact 16 at a relatively sharp angle. Besides, the easily worn tip end angular portion 11a of the movable contact 11 is formed to have a thickness larger than that of the base end portion 11b. The above constitution makes it possible to meet demands for longer life of the contacts, that is, longer life of the battery breaker by forming the easily worn tip angular portion 11a of the movable contact 11 to have the thickness larger than that of the base end portion 11b.

In the embodiment shown in FIG. 47, while a stepped portion is formed on the under surface of the movable contact 11 for making the tip angular portion 11a of the movable contact 11 thicker than the base end portion 11b, the under surface of the movable contact 11 may also be formed in the shape of an inclined surface gradually thickening from the base end portion 11b toward the tip angular portion 11a for making the tip angular portion 11a thicker.

A description will now be given of a means for stabilizing the contact electric resistance between the contacts.

In the battery breaker of the first and second embodiments of the present invention, although the fixed contact 16, the movable piece 12 including the movable contact 11 and the bimetal 20 are enclosed in the case 30, extremely small foreign matters are often adhered to the contact portion between the fixed contact 16 and the movable contact 11 enclosed in the case 30, or fine irregularities are frequently observed on the above contact portion.

From the reasons of the presence of the fine foreign matters and irregularities as described the above, the contact electric resistance between the fixed contact 16 and the movable contact 11 after the assembly of each of the battery breakers of the first and second embodiments was as high as 12 to 18 mΩ.

In this connection, the operation of applying DC6V-15A to the terminal 18 of the fixed contact 16 and the terminal 15 of the movable contact 11 for heating the movable piece 12, the movable contact 11, the fixed piece 17 and the fixed contact 16 was performed for rising the temperature in the case 30 up to a value more than the working temperature of the bimetal 20 to warp the bimetal 20 for separating the movable contact 11 from the fixed contact 16. With the above operation, the contact resistance between the fixed contact 16 and the movable contact 11 is increased at the time of separation of the movable contact 11 from the fixed contact 16. In this place, the fixed contact 16 and the movable contact 11 are heated to break away the adhered fine foreign matters or the like from the fixed contact 16 and the movable contact 11. At the same time, the irregularities on the contact surface are smoothened.

As the result of breaking away the foreign matters or the like from the contact surface, while making the contact surface smooth as described the above, the contact electric resistance between the fixed contact 16 and the movable contact 11 was decreased to the range of 5 to 8 mΩ. Then, it was ascertained that the contact electric resistance between the contacts was stabilized even on and after the above operation.

According to the battery breaker of the present invention, the bimetal is placed in the case without being restricted by the other members, and the projection on the inner bottom surface of the case and the convex portions of the movable piece permit rapid, stable and efficient transmission of the warping and snap actions of the bimetal to the movable contact through the movable piece. Thus, the battery breaker of the present invention may meet demands for further miniaturization, and also may produce the satisfactory effects as the battery breaker enough to be extremely useful from the industrial point of view.

What is claimed is:

1. A battery breaker, comprising:

a case;

a fixed contact mounted to an inner bottom surface of one end of said case and connected to a terminal extending from the case outwards;

an elastic movable piece mounted such that its tip end protrudes into said case through the other end of said case, and allowing a movable contact provided at said tip end to bring into contact with said fixed contact by the spring action; and a convex curved surface-shaped bimetal having a warping center located in the substantial center, and placed between said movable piece and the inner bottom surface except for said one end of said case so as to cover a projection provided on said inner bottom surface without interference of an outer periphery of said bimetal with the inner side surfaces of said case, said bimetal being warped at a predetermined working temperature to push up said movable piece for separating said movable contact from said fixed contact;

wherein the projection has a flat top surface and said bimetal is mounted with its warping center located on the flat top surface of the projection; and wherein said movable piece has downwardly convex portions brought into contact with the opposite ends of said bimetal when said bimetal is warped.

2. A battery breaker, comprising:

a case;

a fixed contact mounted to the inner bottom surface of one end of said case and connected to a terminal extending from the case outwards;

an elastic movable piece mounted such that its tip end protrudes into said case through the other end of said case and allowing a movable contact provided at said tip end to bring into contact with said fixed contact by the spring action; and a convex curved surface-shaped bimetal having a warping center located at a position one-sided from the center, and placed between said movable piece and the inner bottom surface except for said one end of said case so as to cover a projection provided on said inner bottom surface without interference of an outer periphery of said bimetal with the inner side surfaces of said case, said bimetal being warped at a predetermined working temperature to push up said movable piece for separating said movable contact from said fixed contact;

wherein said movable piece has downwardly convex portions brought into contact with the opposite ends of said bimetal when said bimetal is warped.

3. A battery breaker according to claim 1 or 2, wherein said bimetal is similar in planar shape to the inner bottom surface except for said one end of said case, and the outer periphery of said bimetal is placed at a certain distance from the inner side surfaces of said case.

4. A battery breaker according to claim 1 or 2, wherein said case has a housing part for housing said fixed contact, said movable piece and said bimetal, and a cover for sealing up the upper portion of said housing part.

5. A battery breaker according to claim 1 or 2, wherein the projection with said bimetal placed thereon is provided on said inner bottom surface of said case as being located at a position substantially corresponding to the warping center of said bimetal.

6. A battery breaker according to claim 1 or 2, wherein the projection with said bimetal placed thereon is provided on said inner bottom surface of said case as being located at a position corresponding to a portion one-sided from the warping center of said bimetal in the longitudinal direction of said bimetal.

7. A battery breaker according to claim 4, wherein the inner surface of the cover of said case has a support portion brought into contact with the rear side of the convex portion at the case-fixed end side of said movable piece.

8. A battery breaker according to claim 1 or 2, wherein the contact surface of said fixed contact with the movable contact is formed to be substantially flush with the inner bottom surface of said one end of said case, and a tip angular portion of the movable contact is in contact with the upper surface of said fixed contact.

9. A battery breaker according to claim 1 or 2, wherein one or both of the convex positions formed on the movable piece are formed by press molding.

10. A battery breaker according to claim 1 or 2, wherein said movable piece is formed from phosphor bronze.

11. A battery breaker according to claim 1 or 2, wherein said fixed contact and said movable contact are formed from silver alloy containing 10% of nickel.

12. A battery breaker according to claim 1 or 2, wherein the terminal extending from said case outwards in the state of being connected to said fixed contact is formed in a bifurcated shape.

13. A battery breaker according to claim 1 or 2, wherein the terminal extending from said case outwards in the state of being connected to said fixed contact is subjected to nickel plating.

14. A battery breaker according to claim 1 or 2, wherein said fixed contact and said movable contact are once separated from each other by applying current to both said contacts for stabilizing the contact resistance of both said contacts.

15. A battery breaker, comprising:

a case;

a fixed contact mounted to an inner bottom surface of one end of said case and connected to a terminal extending from the case outwards;

an elastic movable piece mounted such that its tip end protrudes into said case through the other end of said case, and allowing a movable contact provided at said tip end to bring into contact with said fixed contact by the spring action; and a convex curved surface-shaped bimetal having a warping center located in the substantial center, and placed between said movable piece and the inner bottom surface except for said one end of said case so as to cover a projection provided on said inner bottom surface without interference of an outer periphery of said bimetal with the inner side surfaces of said case, said bimetal being warped at a predetermined working temperature to push up said movable piece for separating said movable contact from said fixed contact;

wherein said movable piece has downwardly convex portions brought into contact with the opposite ends of said bimetal when said bimetal is warped; and wherein the projection with said bimetal placed thereon is provided on said inner bottom surface of said case as being located at a position corresponding to a portion one-sided from the warping center of said bimetal in the longitudinal direction of said bimetal.

* * * * *